(12) United States Patent
Richardson et al.

(10) Patent No.: US 7,476,371 B2
(45) Date of Patent: Jan. 13, 2009

(54) DISSOLUTION OF COPPER METAL IN AQUEOUS ALKANOLAMINE TO FORM COPPER CONTAINING AQUEOUS SOLUTION

(75) Inventors: Hugh W. Richardson, Sumter, SC (US); Gang Zhao, Sumter, SC (US)

(73) Assignee: Phibro-Tech, Inc., Ridgefield Park, NJ (US)

( * ) Notice: Subject to any disclaimer, the term of this patent is extended or adjusted under 35 U.S.C. 154(b) by 795 days.

(21) Appl. No.: 11/046,804

(22) Filed: Feb. 1, 2005

(65) Prior Publication Data
US 2005/0130866 A1    Jun. 16, 2005

Related U.S. Application Data

(63) Continuation-in-part of application No. 10/660,795, filed on Sep. 12, 2003, now Pat. No. 6,905,531, which is a continuation of application No. 10/074,251, filed on Feb. 14, 2002, now Pat. No. 6,646,147.

(60) Provisional application No. 60/608,538, filed on Sep. 10, 2004.

(51) Int. Cl.
*C07F 1/00* (2006.01)

(52) U.S. Cl. .......................... 423/32; 423/33; 556/110; 556/113

(58) Field of Classification Search .................. 423/32, 423/33; 556/113, 110
See application file for complete search history.

(56) References Cited

U.S. PATENT DOCUMENTS

| | | | |
|---|---|---|---|
| 4,324,578 A | 4/1982 | Seymour et al. | |
| 4,929,454 A | 5/1990 | Findlay et al. | |
| 5,078,912 A | 1/1992 | Goettsche et al. | |
| 6,294,071 B1 | 9/2001 | Miller et al. | |
| 6,646,147 B2 | 11/2003 | Richardson et al. | |
| 6,905,531 B2 | 6/2005 | Richardson et al. | |
| 7,273,944 B2 * | 9/2007 | Pasek et al. .................. | 556/113 |
| 2003/0162986 A1 | 8/2003 | Richardson et al. | |

FOREIGN PATENT DOCUMENTS

| | | |
|---|---|---|
| CA | 2 262 186 A1 | 9/1999 |
| EP | 0 238 051 A | 9/1987 |
| WO | WO 91/11306 A | 8/1991 |
| WO | WO 2005/051961 A | 6/2005 |

* cited by examiner

*Primary Examiner*—Steven Bos
(74) *Attorney, Agent, or Firm*—Morgan, Lewis & Bockius LLP

(57) ABSTRACT

Process for producing a copper-containing aqueous solution, in which a copper mass is dissolved in the presence of air in an aqueous leach liquor containing monoethanolamine and an acid, wherein the amount of acid equivalents is between 0.05 and about 0.7 times the equivalents of monoethanolamine, and wherein the rate of copper dissolution into the aqueous leach liquor is greater than about 4.3 grams of copper per liter of leach liquor per hour until a product having at least about 80 grams per liter is obtaine.

17 Claims, 7 Drawing Sheets

DISSOLUTION OF COPPER METAL IN AQUEOUS ALKANOLAMINE TO FORM COPPER CONTAINING AQUEOUS SOLUTION

RELATED APPLICATIONS

The present application is based on Provisional No. 60/608,538, filed Sep. 10, 2004, and is a continuation-in-part of U.S. application Ser. No. 10/660,795 filed Sep. 12, 2003 now U.S. Pat. No. 6,905,531 which is a continuation of U.S. application Ser. No. 10/074,251, filed Feb. 14, 2002, now U.S. Pat. No. 6,646,147, the contents of which are incorporated herein by reference thereto.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

SEQUENCE LISTING

Not Applicable.

FIELD OF THE INVENTION

The present invention relates to a process for the rapid dissolution of copper metal in an aqueous alkanolamine composition. More particularly, the invention relates to a process for producing a copper-containing aqueous solution by dissolving copper in an aqueous leach liquor containing both monoethanolamine and (monoethanolammonium) salts and in the presence of an oxidant, at copper dissolution rates in excess of 2.1 grams of copper per liter per hour, where at least a portion of the (monoethanolammonium) salts are not carbonates.

BACKGROUND ART

It is known to employ copper-containing aqueous solutions as biocide fluids, for example, for the pressure treatment of lumber and for water purification. Copper-containing solutions may be produced by reacting copper oxide with chromic acid and arsenic acid to produce a solution of the copper with chrome and arsenic. The solution is subsequently diluted with water and the resulting aqueous solution may be injected into wood under pressure. This chromated copper arsenate ("CCA") is the primary additive used in the treatment of wood against termite and other biological infestation. Although the CCA is very effective, it has come under increased pressure because of the environmental concerns associated with chromium and arsenic.

A new generation of pesticide is now emerging that appears to be efficacious, and which relies on the use of copper (in larger quantities than in the CCA) in combination with other pesticidal components, such as quaternary amines and triazoles. The copper is typically applied as a solution of the monoethanolamine complex of copper carbonate or borate. The commercial form of the copper concentrate usually contains about 100 to 130 g/l copper which is diluted with water prior to injection into the wood. It is known to dissolve copper in the presence of alkanolamines such as MEA in the presence of air and carbon dioxide. As described in co-owned U.S. Pat. No. 6,646,147, the copper complex is typically produced commercially by the dissolution of basic copper carbonate in a solution of monoethanolamine (MEA), followed by further carbonation or addition of boric acid. The reactions can be approximately represented by the following equations:

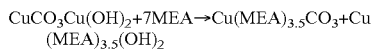

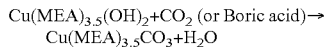

The copper carbonate precursor is expensive, relative to scrap copper metal, and a brine waste is generated by the above process which gives rise to environmental concerns. It is known from the prior art that ammonia and carbon dioxide added to water can be used to dissolve copper metal with oxygen from air as the oxidant. This is represented by the following equation:

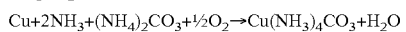

The reaction proceeds well and has been the basis for copper dissolution in several commercial facilities.

Other examples of dissolution of copper or copper salts utilizing such fluids and uses thereof may be found, for example, in U.S. Pat. No. 4,929,454 and U.S. Pat. No. 6,294,071. The copper-containing solutions may be formulated, for example, by dissolving copper in aqueous solutions containing alkyl amines or alkyl hydroxy amines, such as 2-hydroxyethylamine. U.S. Pat. No. 6,294,071 states "in one conventional batch process for producing copper-containing amine solutions, approximately five days is required to achieve the target copper concentration (i.e., about 8%)," and subsequently discloses a method to dissolve copper that requires the imposition of a galvanic or electrolytic driving force to accelerate the process to provide a product after dissolution "of about one day". The use of electricity is not desirable, as the energy costs can be significant, and the process (having large electric current flows through flammable and/or explosive solvents) is inherently hazardous.

U.S. Pat. No. 5,078,912 discloses a composition that contains copper, MEA, free alkali, and a salt of a fungicidal anion (such as fluoride, borate, or fluoroborate). The process of manufacture of this composition comprises dissolving copper salts, e.g., copper carbonate. U.S. Pat. No. 4,808,407 discloses a process to prepare water soluble copper salts of carboxylic acids, said acid containing from about 10 to 30 carbon atoms. The dissolution of copper powder with air in the presence of MEA is described. U.S. Pat. No. 4,324,578 discloses a process to prepare an algaecide using copper carbonate, MEA, and triethanolamine.

The prior art processes using copper metal had kinetics which were very poor such that the process was unattractive from a commercial standpoint. The kinetics of the processes are improved if the amine is initially carbonated, but dissolution of 100 grams of copper into a liter of an alkanolamine/water mixture typically took 3 to 6 days. Co-owned U.S. Pat. No. 6,646,147, the disclosure of which is incorporated herein by reference, describes a process which accelerated the dissolution rate of copper in a partially carbonated aqueous MEA solution to a rate where copper-MEA-carbonate compositions could be formulated at rates (and costs) that made this process commercially feasible for the wood preservative market. The kinetics of the processes are further improved if the partially carbonated aqueous MEA solution comprises a small amount of dissolved copper, and dissolution of 100 grams of copper into a liter of a partially carbonated aqueous MEA solution can be achieved in under 6 hours.

A need exists for additional efficient, fast, and inexpensive processes for producing copper containing aqueous solutions, suitable for use in the wood-treatment industry. The present invention seeks to fill that need.

SUMMARY OF THE INVENTION

The use of carbon dioxide and air, added to aqueous alkanolamine or aqueous ammonia compositions, is currently the preferred method in the industry of dissolving copper and forming the desired copper complexes which are useful in wood preservation and fungicidal formulations. The use of an aqueous partially carbonated MEA composition to dissolve copper in a commercially feasible amount needed for use in the wood preservative industry can be cumbersome, as a large source of carbon dioxide and means to add measured amounts of carbon dioxide to the fluid are needed. Generally carbonic acid is added to aqueous ammonia and/or alkanolamine compositions by sparging measured amounts of carbon dioxide gas through the composition. It is often difficult with gas sparging to know how much carbon dioxide is added, and how much of the added carbon dioxide was absorbed. In the prior art processes carbon dioxide is added to maintain the pH within a broad pH range, for example pH 7-14. Therefore, pH was the parameter used to monitor the carbon dioxide concentration (carbon dioxide formed carbonic acid, which subsequently disassociated to 2H+ and carbonate). However, pH measurements are imprecise at the high pH range where preferred dissolution rates are obtainable. The presence of variable amounts of MEA and complexed copper, each of which affect the pH of the composition, are additional factors which make relating the pH to the quantity of carbonate present difficult.

The use of liquid acid compositions instead of carbon dioxide allows easier control and monitoring of added acid (and counter-ions). Additionally, some economic advantages can be obtained by the use of other sources of acid, depending on local conditions and the availability of inexpensive acidic solutions which are typically the by-product of other industries. There are many industrial processes that provide a waste product that is an acid contaminated with small amounts of dissolved metals. This waste stream is often considered hazardous waste, even if the dissolved metals are relatively benign. Therefore, those industries generating such waste typically pay premiums to dispose of this waste stream. Such a stream, however, can be readily used by the copper dissolution process described here, providing a significant advantage over a process using carbon dioxide as the sole acid source.

An additional advantage of using acids other than carbonic acid is that the acid can be used to clean and activate the copper mass, prior to starting the copper dissolution process. The copper mass can comprise some copper salts and/or copper powder (e.g., copper fragments with an average diameter less than about 400 microns, for example about 200 microns). Such materials are significantly more expensive than scrap copper, which is the preferred feedstock. Advantageously, at least 50%, preferably at least 80%, and typically more than 95% of the copper is scrap copper in the form of wire, popcorn (with at least one dimension greater than ¼ inch, typically with at least one dimension being greater than ½ inch. Nevertheless, high dissolution rates, e.g., greater than 2.1 grams copper per liter per hour, preferably greater than 8.5 grams copper per liter per hour, and typically at least about 17 grams copper per liter per hour, can be maintained. To achieve high dissolution rates, the copper mass should be free of coatings, including for example a layer of copper oxide often present on scrap copper, which will inhibit the oxidation/solvation process. The use of aqueous acids, as opposed to carbon dioxide, in the dissolution process allows the copper mass to be pre-contacted with an aqueous acidic composition of sufficient strength that the coating materials are readily dissolved. This aqueous acidic composition would first be used to remove copper oxide and other salts that otherwise would slow the rate of dissolution of the copper mass in the leach liquor. But, advantageously, this acid is then be added to the aqueous MEA solution to obtain the leach liquor. Such a pre-treatment of the copper mass will make the subsequent dissolution process go faster, both because the copper will be cleaned of residue, and because the acid will add a small but catalytic quantity of dissolved copper to the initial leach liquor.

There are numerous other benefits that result from utilizing other acid sources in place of, or partially in place of, carbon dioxide. For compositions having ultimate use as a wood preservative, improved copper retention properties and stability can be obtained by using certain cations other than carbonate, including particularly phosphate. Improved biocidal properties can be obtained by using certain cations other than carbonate, including particularly borate. Certain cations are not desirable, including in particular fatty acids.

It has been discovered, according to the present invention, that it is possible to efficiently and rapidly produce copper-containing solutions of sufficient copper concentration directly from copper, without initially producing or isolating a copper salt precursor such as copper carbonate. The present invention accordingly provides a process for producing an aqueous complexed copper-containing solution, wherein a copper mass is dissolved in the presence of an oxidant, water, an alkanolamine, and one or more counter-ions, wherein the counter-ions are beneficially obtained from one or more acids, where advantageously the pH is controlled between 8 and 13, preferably between 9 and 12.5, for example between 9.5 and 12.5 or alternatively between about 10.5 and 12.5, and the quantity of counter-ions is such that a portion, for example at least about 3%, preferably at least about 5%, for example between 5% and 40%, of the alkanolamine is in the form of a precursor $(H)_y$(alkanolamine)$_x$(counter-ion). For example, where MEA is the preferred alkanolamine and borate from boric acid is a preferred counter-ion, the composition comprises water, MEA, and at least one of (H)(H-MEA)$_2$-BO$_3$ or (H-MEA)$_3$-BO$_3$, or partially disassociated versions thereof. In this application, unless specifically stated the quantity of any component, such as MEA, is the total MEA including that which form part of stable complexes.

The invention includes a process for producing a copper-containing aqueous solution, comprising dissolving a copper mass in the presence of an oxidant in an aqueous leach liquor containing MEA and a monoethanolammonium anion complex, e.g. (HMEA)$_2$CO$_3$ or (HMEA)$_2$SO$_4$ or (HMEA)$_3$BO$_4$, and/or such complexes where one HMEA is replaced by H, and maintaining the pH of the aqueous leach liquor between 8 and 13, wherein said aqueous leach liquor is produced by partially complexing the MEA by combining the aqueous MEA with selected acids at predetermined concentrations. Advantageously the aqueous leach liquor comprises between about 30% and about 45% by weight of total MEA, and the aqueous leach liquor dissolves between 100 grams and 130 grams of copper per liter of aqueous leach liquor in 48 hours or less, alternatively more than 70 grams of dissolved copper per liter of aqueous leach liquor in 24 hours or less. The rate of dissolution of copper is critical to the economic viability of the process, and the average rate of copper dissolution should be greater than 2.5 g Cu per liter-hour, preferably greater than 5 g Cu per liter-hour, more preferably greater than 10 g Cu per liter-hour, for example between about 10 and about 40 g Cu per liter-hour, or alternatively between about 17 and about 30 g Cu per liter-hour. The oxidant is selected from the group consisting of air, oxygen, or mixtures thereof. The process is carried out at a temperature greater than about 15° C., for example from 25° C. to 100° C., preferably at a temperature of 40° C. to 80° C., for example at a temperature of 45° C. to 55° C. Advantageously the copper metal is a copper mass having a three dimensional open network that is permeable to the leach liquor, wherein there is a large excess of copper metal (e.g., greater than 200 grams, preferably greater than 400 grams, of copper per liter of aqueous leach liquor). The copper mass is immersed in the leach liquor, or, if the flow kinetics are such that a continuous liquid phase is not formed, then the leach liquor wets and forms a film flowing over the copper. The amount of copper mass may advantageously be so great that stirring the contents of the reactor is impracticable, in which case the step of dissolving comprises circulating the aqueous leach liquor through the copper mass with a circulation pump, wherein said circulating comprises withdrawing aqueous leach liquor from a location on a first side (e.g., below) the copper mass and reintroducing the withdrawn aqueous leach liquor at a location on a second side (e.g., above) the copper mass. Circulation is typically carried out at a rate of about 2% to about 20%, for example from about 2% to about 10%, of the volume of the leach solution per minute for a reactor of nominal size of 5000 to 20000 gallons. Too slow a circulation rate and the flow may not be turbulent, while too fast a rate risks corrosion, excessive wear on equipment, overflowing the reactor due to an insufficient drain rate of solution through the mass of copper, and the high costs of energy that may not be ameliorated by higher copper dissolution rates.

The invention is a process for producing a copper-containing aqueous solution comprising between about 90 and about 130 grams of dissolved copper per liter of solution, said process comprising:

providing a leach liquor comprising water, MEA, and monoethanolammonium salt, wherein said monoethanolammonium salt is produced by admixing at least one acid with an aqueous MEA composition in an amount sufficient to provide at least 0.03 equivalents of acid per mole of MEA, preferably between about 0.05 and about 0.7 equivalents of acid per mole of MEA, wherein the acid is selected from the group consisting of carbonic acid, phosphoric acid, sulfuric acid, boric acid, nitric acid, hydrofluoric acid, hydrochloric acid, fluoboric acid, oxalic acid, malonic acid, gallic acid, citric acid, ascorbic acid, formic acid, acetic acid, propionic acid, or mixture thereof, except that if the acid is carbonic acid there is at least one other acid additionally present;

providing a copper mass having a three dimensional open network that is permeable to the leach liquor, wherein the copper mass is present in an amount greater than about 200 grams per liter of leach liquor;

providing to the reactor a gas comprising air, oxygen, or mixture thereof; and contacting the leach liquor with the air, oxygen, or mixture thereof and with the copper mass, thereby causing dissolution of a portion of the copper mass and forming the copper-containing aqueous solution product comprising between about 90 and about 130 grams of dissolved copper per liter of product, wherein the temperature of the leach liquor is maintained at a temperature between about 18° C. and 100° C., and wherein the average copper dissolution rate is greater than about 2.1 grams of copper per liter of leach liquor per hour.

In the above process the aqueous leach liquor advantageously comprises between about 30% and about 45% by weight of total MEA, and wherein the average copper dissolution rate is greater than about 4.2 grams of copper per liter of leach liquor per hour, so that the aqueous leach liquor dissolves at least 100 grams of copper per liter of aqueous leach liquor in 24 hours or less. In the above process the aqueous leach liquor dissolves between 100 grams and 130 grams of copper per liter of aqueous leach liquor in 8 hours or less. In the above process advantageously the acid comprises boric acid.

In any of the embodiments described here, the acid can advantageously be contacted with the copper mass prior to introduction of all the alkanolamine, so that an aqueous acidic formulation is sufficiently acid that it can dissolve a small amount, e.g., at least 0.1 grams per liter, of copper oxides or other copper salts which are on the surface of the copper mass, thereby exposing fresh copper metal to the leach liquor.

Generally, the pH of the aqueous leach liquor is maintained between 9 and 12.5, and the temperature of the leach liquor is maintained at a temperature between about 40° C. and about 80° C. In some embodiments of the above process advantageously the pH of the aqueous leach liquor is between 10.2 and 12.7. In other embodiments of the above process advantageously the pH of the aqueous leach liquor is between 9.5 and 12.5, and the temperature of the leach liquor is maintained at a temperature between about 45° C. and about 65° C. In some embodiments of the above process advantageously the leach liquor comprises between 30% to 50% MEA and between 2% to 15% boric acid as $H_3BO_3$. In some embodiments of the above process advantageously the leach liquor comprises between 30% to 50% MEA and between 5% to 25% citric acid. In some embodiments of the above process advantageously the leach liquor comprises between 30% to 50% MEA and between 5% to 20% sulfuric acid. In some embodiments of the above process advantageously the leach liquor comprises between 30% to 50% MEA and between 4% to 20% phosphoric acid. In some embodiments of the above process advantageously the leach liquor comprises between 30% to 50% MEA and between 5% to 18% hydrochloric acid. In some embodiments of the above process advantageously the leach liquor comprises between 30% to 50% MEA and between 5% to 25% oxalic acid. In a preferred embodiment of the above process advantageously the leach liquor comprises boric acid and one or more of phosphoric acid, sulfuric acid, and carbonic acid. In some embodiments of the above process advantageously the average copper dissolution rate is at least 8.3 grams of copper per liter of leach liquor per hour, and the flow rate of gas is between 0.8 and 4 standard cubic feet per hour per gallon of leach liquor. In preferred embodiments of the above process advantageously the average copper dissolution rate is at least 12.5 grams of copper per liter of leach liquor per hour, e.g., is at least 17 grams of copper per liter of leach liquor per hour. In preferred embodiments of the above process advantageously the process further comprises the step of heating the aqueous leach liquor to a temperature of at least about 40° C.

In most preferred embodiments of the above process advantageously the aqueous leach liquor dissolves between 100 and 130 grams of dissolved copper per liter in about 4 to about 6 hours, alternatively in 8 hours or less. In some embodiments of the above process advantageously the process further comprises the step of adding to the aqueous leach liquor an amount of copper-containing aqueous solution to provide an initial dissolved copper concentration in the aqueous leach liquor between 1 gram per liter and 17 grams per liter. In some embodiments of the above process advantageously the acid comprises one or more of acetic acid, citric acid, oxalic acid, sulfuric acid, phosphoric acid, and boric acid, wherein the total equivalents of these acids is at least 0.05 times the equivalents (moles) of alkanolamine.

In some embodiments of the above process advantageously the leach liquor comprises at least about 0.5 wt. % of a first acid selected from the group consisting of citric acid, oxalic acid, sulfuric acid, phosphoric acid, boric acid, carbon dioxide, or mixture thereof, and at least 1 wt. % of a second acid, wherein the second acid is different than the first acid. For example, the second acid may be oxalic acid, malonic acid, acetic acid, formic acid, propionic acid, hydrochloric acid, hydrofluoric acid, acidic boride, hydrobromic acid, nitric acid, fluoroboric acid, or a mixture thereof. Alternatively, the first acid is boric acid and the second acid comprises carbonic acid, citric acid, oxalic acid, malonic acid, acetic acid, formic acid, propionic acid, ascorbic acid, hydrochloric acid, hydrofluoric acid, hydrobromic acid, sulfuric acid, phosphoric acid, nitric acid, fluoroboric acid, or mixture thereof, wherein boric acid makes up at least half of the equivalents of the total acids added to the aqueous leach liquor. Alternatively, the first acid is sulfuric acid and the second acid comprises carbonic acid, citric acid, oxalic acid, malonic acid, acetic acid, formic acid, propionic acid, ascorbic acid, hydrochloric acid, hydrofluoric acid, hydrobromic acid, boric acid, phosphoric acid, nitric acid, fluoroboric acid, or mixture thereof, wherein sulfuric acid makes up at least half of the equivalents of the total acids added to the aqueous leach liquor. Alternatively, the first acid is citric acid and the second acid comprises carbonic acid, boric acid, oxalic acid, malonic acid, acetic acid, formic acid, propionic acid, ascorbic acid, hydrochloric acid, hydrofluoric acid, hydrobromic acid, sulfuric acid, phosphoric acid, nitric acid, fluoroboric acid, or mixture thereof, wherein citric acid makes up at least half of the equivalents of the total acids added to the aqueous leach liquor. Alternatively, the first acid is phosphoric acid and the second acid comprises carbonic acid, boric acid, oxalic acid, malonic acid, acetic acid, formic acid, propionic acid, ascorbic acid, hydrochloric acid, hydrofluoric acid, hydrobromic acid, sulfuric acid, citric acid, nitric acid, fluoroboric acid, or mixture thereof, wherein phosphoric acid makes up at least half of the equivalents of the total acids added to the aqueous leach liquor.

In a preferred embodiment of the above process the leach liquor provided consists essentially of the reaction product formed by mixing water; 30% to 50% MEA; about 0.05 and about 0.7 equivalents of acid of acid per mole of MEA, where the acid is selected from the group consisting of carbonic acid, phosphoric acid, sulfuric acid, boric acid, nitric acid, hydrofluoric acid, hydrochloric acid, fluoboric acid, oxalic acid, malonic acid, gallic acid, citric acid, ascorbic acid, formic acid, acetic acid, propionic acid, or mixture thereof, per mole of MEA, except that if the acid is carbonic acid there is at least one other acid additionally present; and between about 0.05 to about 17 grams of dissolved copper per liter of aqueous leach liquor. In any of the embodiments described here, at least a portion of the acid can be formulated into an acidic aqueous composition, having for example a pH less than 4.5, preferably less than 3.5, wherein this acidic composition is contacted with the copper mass prior to introduction of all the alkanolamine. The aqueous acidic formulation is sufficiently acid that it can dissolve a small amount, e.g., at least 0.1 grams per liter, preferably at least 1 gram per liter, of copper oxides or other copper salts which are on the surface of the copper mass, thereby exposing fresh copper metal to the leach liquor. A small amount of MEA or ammonia added to the acidic formulation can greatly increase the copper-solvating capacity of the acidic composition. Then, alkanolamines and/or ammonia, and usually also water, are added to the acidic composition in an amount sufficient to make the leach liquor. Such a method will make the copper mass very reactive, and will also introduce a small amount of copper ions to the leach liquor.

The invention further includes a process for producing a copper-containing aqueous solution comprising between about 100 and about 130 grams of dissolved copper per liter of solution, said process comprising:

providing a leach liquor comprising the reaction product formed by mixing:
water,
at least one alkanolamine,
optionally ammonia, wherein the moles of ammonia if present are less than about one third of the moles of alkanolamine, and
at least one acid in an amount sufficient to provide between about 0.1 and about 0.7 equivalents of acid per mole of alkanolamine and ammonia, wherein the acid is not carbonic acid;
providing a copper mass that is permeable to the leach liquor, wherein the copper mass is present in an amount greater than about 400 grams per liter of leach liquor and wherein the copper surface area is at least about 0.01 m$^2$ per kilogram of copper;
providing to the reactor a gas comprising molecular oxygen; and
contacting the leach liquor with the gas and with the copper mass, thereby causing dissolution of a portion of the copper mass and forming the copper-containing aqueous solution product comprising between about 100 and about 130 grams of dissolved copper per liter of solution, wherein the temperature of the leach liquor is maintained at a temperature between about 30° C. and 90° C., and wherein the average copper dissolution rate is greater than about 4.2 grams of copper per liter of leach liquor per hour. Alternatively, the average copper dissolution rate is at least 8.3 grams of copper per liter of leach liquor per hour, wherein at least one half the moles of alkanolamine are MEA, and wherein the acid comprises a mineral acid, for example when the mineral acid comprises a divalent or trivalent mineral acid selected from the group consisting of phosphoric acid, sulfuric acid, boric acid, or mixture thereof. Alternatively, the leach liquor provided comprises the reaction product formed by mixing water, alkanolamine, optionally ammonia, the at least one mineral acid that is not carbonic acid, and further including carbonic acid formed by addition of at least 0.025 moles of carbon dioxide per mole of alkanolamine and ammonia.

Alternatively, the average copper dissolution rate is at least 8.3 grams of copper per liter of leach liquor per hour, wherein at least one half the moles of alkanolamine are MEA, and wherein the acid comprises an organic acid, e.g., wherein the carboxylic acid comprises a divalent or trivalent organic acid selected from the group consisting of oxalic acid, malonic acid, gallic acid, citric acid, ascorbic acid, formic acid, acetic acid, propionic acid, or mixture thereof. Alternatively, the leach liquor provided comprises the reaction product formed by mixing water, alkanolamine, optionally ammonia, the at least one organic acid, and further including carbonic acid formed by addition of at least 0.025 moles of carbon dioxide per mole of alkanolamine and ammonia. Alternatively, the acid comprises the at least one organic acid and further comprises boric acid. In preferred embodiments the average copper dissolution rate is at least 12.5 grams of copper per liter of leach liquor per hour, for example at least 16 grams of copper per liter of leach liquor per hour. To reach higher rates, the temperature of the aqueous leach liquor should be at least 40° C.

In some embodiments, the leach liquor provided comprises between 0.1 wt. % and 4 wt. % ammonia in addition to the MEA. Alternatively or additionally, the leach liquor provided comprises between 0.1 grams and 17 grams of dissolved copper per liter. In preferred embodiments the product comprising between 100 and 130 grams of dissolved copper per liter is produced in about 4 to about 6 hours, alternatively in about 8 hours or less.

The invention also includes a process for producing a copper-containing aqueous solution, comprising dissolving a copper mass in the presence of oxygen in an aqueous leach liquor containing the reaction product of water, 30 wt. % to 50 wt. % MEA, and an acid in an amount between 0.05 and 0.7 equivalents of the acid per mole of MEA, wherein the acid comprises an acid other than carbonic acid, the average copper dissolution rate is greater than about 8.3 grams of copper per liter of leach liquor per hour, and the copper-containing aqueous solution produced comprises between about 80 and about 130 grams of dissolved copper per liter. Advantageously, the acid comprises a divalent or trivalent acid. In a preferred embodiment, at least 20% of the equivalents of acid added to the product are boric acid. Alternatively or additionally, the aqueous leach liquor further comprises between 0 and about 4% ammonium, and wherein the total equivalents of acid added is between about 0.4 to 0.65 of the total moles of alkanolamines and ammonium. High dissolution rates are obtained when the surface area of the copper mass is at least 0.01 m per kilogram of copper, and these rates are maintained when the amount of copper mass contacting the aqueous leach liquor is between 0.5 kilograms and say about 5 kilograms per liter of aqueous leach liquor. By high dissolution rate we mean the average copper dissolution rate is 10 or more grams of copper per liter of leach liquor per hour. Advantageously, the copper mass is pre-washed with acid to remove oxides which may impair copper dissolution.

The process is typically run at atmospheric pressure, though in one embodiment the oxygen is provided by sparging a gas comprising air though the leach liquor, wherein the pressure at a point where the air first contacts the leach liquor is at least 5 psig. The gas is air or oxygen-enriched air having between 0.1 and 10 volume % oxygen admixed with air, and wherein the flow rate of the gas is advantageously between 1.6 and 3 standard cubic feet per hour per gallon of leach liquor. In a preferred embodiment the process the aqueous leach liquor consisting essentially of water, at least 20 wt. % MEA, optionally alkanolamines other than MEA and/or ammonia, wherein the moles of MEA exceed the total moles of ammonia and alkanolamines other than MEA, and at least one divalent or trivalent acid in an amount sufficient to maintain the pH of leach liquor between about 9 and 12.5, wherein the at least one divalent or trivalent acid is not carbonic acid, and the total equivalents of acid are between about 0.1 and 0.6 times the total moles of alkanolamines and ammonia, wherein the average copper dissolution rate is greater than about 8.3 grams of copper per liter of leach liquor per hour until a copper-containing aqueous solution having at least 80 grams of dissolved copper per liter is obtained. In a preferred embodiment the aqueous leach liquor dissolves between 100 grams and 130 grams of copper per liter of aqueous leach liquor in 8 hours or less, and the pH is between 10 and 12 or between 11.7 and 12.2. In one embodiment, there are a plurality of acids, and at least 10% of the equivalents of acid are boric acid, carbonic acid, or mixture thereof.

The process to make a final product can be two stage, wherein a first product having between about 80 and about 120 grams of dissolved copper per liter is obtained as described above, the process further comprising contacting the first product with an oxidant and copper mass for a time sufficient to increase the dissolved copper between 5 and 40 additional grams of copper per liter to form a final product, wherein the average rate of dissolution of copper into the first product is less than 4.3 grams of copper per liter per hour.

If the aqueous leach liquor further comprises ammonia, then the moles of ammonia is less than about one third of the moles of alkanolamine, for example, when the mole ratio of alkanolamine(s) to ammonia range from 100:1 to 5:1. Preferably at least 85% of the total moles of alkanolamines and ammonia are MEA. In some embodiments the acid comprises a divalent or trivalent carboxylic acid. In preferred embodiments the leach liquor comprises at least 0.3 equivalents of boric acid per equivalent of total alkanolamine, or alternatively the leach liquor comprises at least 0.3 equivalents of carbonate, borate, phosphate, sulfate, citrate, oxalate, malonate, or mixtures thereof per equivalent (mole) of alkanolamine. Typically, the oxidant is air added at a rate of between about 12,000 to about 24,000 standard cubic feet per hour per 11,500 gallons of volume.

Not all acid must be added at the beginning of the dissolution process. In one embodiment, some acid is further added during the dissolution of copper metal, wherein the total equivalents of acids added to the aqueous leach liquor is between 0.2 to 0.6 times the total moles of alkanolamines and ammonia. Alternatively, the ratio of acid equivalents to the total moles of alkanolamines and ammonia is initially between 0.03:1 to 0.15:1, the process further comprising adding additional acid to the leach liquor during dissolution to obtain a product comprising between 0.3 and 0.7 equivalents of acid per total moles of alkanolamines and ammonia. Preferred acids include citric acid, oxalic acid, sulfuric acid, phosphoric acid, and boric acid.

In one embodiment the leach liquor comprises at least about 0.5% of a first acid selected from the group consisting of citric acid, oxalic acid, sulfuric acid, phosphoric acid, boric acid, carbon dioxide, or mixture thereof, and at least 1% of a second acid, wherein the second acid is different than the first acid.

Advantageously the amount of copper mass is between 500 grams and 5000 grams per liter of aqueous leach liquor. Faster initial rates are obtained if the copper mass is pre-washed with acid to remove oxides which may impair copper dissolution.

An exemplary process uses a leach liquor comprising partially complexed MEA, for example according to the following equation where boric acid is the acid:

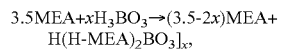

where x is between about 0.1 and 1.5, preferably between about 0.2 and 1.0. In selected embodiments the acid comprises carbonic acid added in the form of carbon dioxide, where the partial complexing is termed "partial carbonation." Beneficially, if monovalent acids and/or organic acids are to be added to the leach liquor, carbonic acid, boric acid, or both are also used. Alternatively, phosphoric acid can be used if monovalent acids and/or organic acids are to be added to the leach liquor. Otherwise, the quantity of acid required will reduce the mass of copper that can be complexed by the resulting product. Additionally, when there is at least one other acid present, in preferred embodiments of the invention, carbonic acid, boric acid, or both are advantageously also present in an amount sufficient to provide at least 10% (as acid equivalents) of the equivalents of acid to be added. Typically, the equivalents of acid to be added are between about 3% to 80%, typically between 5% and 70%, e.g., between 10 and 65% or between 40 and 65%, of the equivalents (typically moles) of alkanolamines and ammonium (if any) present. For MEA-based leach liquors, the pH of the leach liquor is beneficially 8 to 13, preferably 9 to 12.5, for example 9.5 to 12.5.

In preferred embodiments of the invention, the dissolution process is performed as a batch process, wherein the average copper dissolution rate is about 2.5 to 40 g/1-hour, more typically about 8 to about 18 g/1-hour. The process can also be performed as a continuous process. In one embodiment, a first product having between about 80 and about 120 grams of dissolved copper per liter is prepared by a batch process, and the copper content of the product is subsequently increased to between 100 and 130 grams of dissolved copper per liter, where the subsequent increase is achieved by a separate continuous or batch process.

If carbonic acid is the primary or sole acid, then advantageously the aqueous leach liquor comprises about 0.5 to 5% or from 1 to 12% by weight of carbon dioxide. An exemplary leach liquor comprises between about 32% and about 40% by weight of MEA and between about 0.5% and about 5% by weight of carbon dioxide. At 20% MEA and 0.5% carbon dioxide, there is only 0.07 equivalents of acid per equivalent of MEA. The resulting composition may not be able to completely utilize the MEA to complex copper in the dissolved state. At 36% MEA and 5% carbon dioxide, there is 0.4 equivalents of acid per equivalent of MEA. At 36% MEA and 9% carbon dioxide, there is 0.7 equivalents of acid per equivalent of MEA. This is near the ideal ratio of 2 equivalents of acid per 3.5 mole of MEA, at a ratio of about 0.57:1, which provides a stable product having ability to complex large amounts of copper.

The invention also encompasses a process for producing a copper-containing aqueous solution product, said process comprising:
    providing in a packed tower a copper mass having a three dimensional open network permeable to an aqueous solution;
    providing an aqueous leach liquor comprising water, MEA, and $(HMEA)_2CO_3$, $H(HMEA)_2PO_4$, $(HMEA)_2SO_4$, $H(HMEA)_2BO_3$, $(HMEA)F$, $(HMEA)Cl$, $(HMEA)_2oxalate$, $(HMEA)_2malonate$, $(HMEA)_2Citrate$, $(HMEA)BF_4$, $(HMEA)formate$, $(HMEA)acetate$, $(HMEA)propionate$, or mixtures thereof, wherein said aqueous leach liquor is produced by forming an aqueous composition comprising carbonic acid, phosphoric acid, sulfuric acid, boric acid, hydrofluoric acid, hydrochloric acid, oxalic acid, malonic acid, citric acid, fluoboric acid, formic acid, acetic acid, propionic acid, or mixture thereof, respectively, and about 30% and about 45% by weight of MEA including that MEA which is part of a salt;
    providing air, oxygen, or mixture thereof; and
    contacting the aqueous leach liquor with the air, oxygen, or mixture thereof and with the copper mass, thereby causing dissolution of a portion of the copper mass and forming the copper-containing aqueous solution product, wherein the aqueous leach liquor pH is between 8 and 13 and the temperature is between 25° C. and 100° C., and wherein the aqueous leach liquor dissolves between 100 grams and 130 grams of copper per liter of aqueous leach liquor in 48 hours or less. In preferred embodiments, if carbonic acid or carbon dioxide was added to the aqueous MEA, there is at least one other acid, for example at least one other of the listed acids, also added to the aqueous MEA.

Advantageously, the pH of the aqueous leach liquor is between 9 and 12.5, preferably between 9.5 and 12.5, alternatively between 10.2 and 12.7, for example between 11.7 and 12.2. Acid and/or alkanolamine (or ammonia or ammonium salts) can be added to control the pH, or the pH can be allowed to drift as the leach liquor dissolves copper. In a preferred embodiment, the pH is greater than about 10.5 during the early part of the process, e.g., until the composition has dissolved at least 80 grams copper per liter, and then the pH is adjusted down to between 9 and 10 by addition of one or more of the listed acids, e.g., phosphoric acid, phosphorus acid, sulfuric acid, sulfurous acid, boric acid or compounds which hydrate to form boric acid, hydrochloric acid, acetic acid, any of the other listed acids, or mixtures thereof. In preferred embodiments, the temperature of the leach liquor is maintained at a temperature between about 40° C. and about 80° C., for example between 45° C and 65° C., alternatively between 50° C. and 70° C. Advantageously, the aqueous leach liquor dissolves between 100 grams and 130 grams of copper per liter of aqueous leach liquor in 12 hours or less, for example in 8 hours or less, for example between about 6 and about 8 hours.

Advantageously the leach liquor is free of ammonium hydroxide. In another embodiment, up to about one half of the moles of alkanolamine, e.g., MEA, in the aqueous leach liquor can be replaced by ammonia. Preferably, if ammonia is added, less than about one third of the moles of alkanolamine is replaced by ammonia.

Advantageously the leach liquor is free of alkali metal hydroxides. Advantageously the leach liquor is free of polyamines. Advantageously the leach liquor is free of alcohols.

Advantageously the leach liquor is free of ammonium carboxylic acids. In another embodiment, up to all of the acid added to the aqueous leach liquor can be carboxylic acids. If all of the acids are carboxylic acids, than an inexpensive acid such as acetic acid is preferred, or alternatively a multivalent acid such as oxalic acid, malonic acid, citric acid, or the like is preferred, or a mixture thereof. Preferably, if carboxylic acid is added to the aqueous leach liquor, less than about one third of the equivalents of total acid to be added is carboxylic acid, and the remaining acid is a mineral acid such as phosphoric acid, phosphorus acid, sulfuric acid, sulfurous acid, boric acid or compounds which hydrate to form boric acid, and/or carbonic acid.

The process benefits by heating the ingredients during start-up and cooling the ingredients during the high rate copper dissolution, and this is advantageously done with a heat exchanger. As used herein, the startup phase is the period when the leach liquor comprises less than about 5 grams dissolved copper per liter, or when the copper dissolution rate is less than about 4 grams per liter per hour. These parameters are not important. The temperature can be held constant or be allowed to vary between predetermined boundaries, e.g., at a temperature between 25° C. and 100° C., preferably at a temperature between 30° C. and 80° C., for example at a temperature between 40° C. and 80° C. The key is to obtain the desired temperature and to the maintain the desired temperature or temperature program. The dissolution of acid into the alkanolamine generates heat, and the dissolution of the copper mass into the leach liquor generates heat. The composition will lose heat to the environment, and the passage of air through the composition will also remove heat. Balancing the heat generation and removal is within the skill of one of ordinary skill in the art, based on this disclosure.

The invention also encompasses a process for producing a copper-containing aqueous solution comprising:

providing an aqueous leach liquor comprising water, MEA, and carbon dioxide, boric acid, or mixture thereof, wherein the temperature of the leach liquor is maintained at a temperature between 25° C. and 100° C. and the pH of the leach liquor is between 9 and 12.5;

providing oxygen; and contacting the leach liquor and the oxygen with copper metal, thereby causing dissolution of at least a portion of the copper metal and forming the copper-containing aqueous solution. The rate of dissolution of copper metal is advantageously between about 5 and about 36 grams of copper metal dissolved per liter of leach liquor per hour. Preferably the rate of dissolution of copper metal is at least 17 grams of copper metal dissolved per liter of leach liquor per hour. If acid is to be added during the dissolution process, carbon dioxide can be added to the gas comprising molecular oxygen. Advantageously the contacting is done in a packed tower having a volume, wherein the step of adding oxygen comprises adding air at a rate of between about 12,000 to about 24,000 standard cubic feet per hour per 11,500 gallons of volume. The leach liquor is advantageously circulated, removing leach liquor from the bottom of the packed tower and reintroducing the leach liquor to the top of the packed tower.

The aqueous leach liquor comprises at least about 0.05 equivalents of acid per total equivalents of alkanolamines and ammonia during dissolution. Indeed, the lower the acid content, the faster the dissolution rate is, to a point. The aqueous leach liquor preferably comprises at least about 0.1 equivalents of acid per total equivalents of alkanolamines and ammonia, if any, where the acid combines with a portion of the alkanolamines to form an alkanolammonium salt. The acid(s) provide the anions, also called counter-ions. The counter-ions can be any of carbonate, borate, citrate, oxalate, malonate, acetate, formate, propionate, ascorbate, chloride, fluoride, boride, bromide, sulfate, phosphate, nitrate, fluoroborate, or any mixtures thereof. Advantageously, the counter-ion is added as an acid, or as a gas that forms an acid, or a combination thereof. In some embodiments the acids can be added as salts, e.g., as ammonium salts, for example. Generally, the preferred acids are the least expensive acids available. However, while HCl is inexpensive, the chloride ion is not preferred as it can promote corrosion in many end-uses. Nitric acid is not preferred because it may encourage biological growth. On the other hand, boric acid is preferred even at an increased cost because boric acid has biocidal and fire-resisting properties that are generally beneficial for wood preservatives, which is the preferred end use for many of the products produced by the process of this invention. Carbon dioxide (carbonic acid) is preferred because of its cost and ease of use, especially when combined with one or more other acids.

Two counter-ions can be incorporated into the final product, and the ratio of different counter-ions can be any ratio, e.g., from 100:1 to 1:100. More than two counter-ions can be used. The counter-ions can include monovalent species, divalent species, trivalent species, or any mixture thereof. Generally, counter-ions having a valence of minus two or minus three at the desired pH of between 8 and 13 are preferred, e.g., carbonate, borate, phosphate, sulfate, citrate, oxalate, malonate, or mixtures thereof, are preferred. Carbonate (from carbonic acid), borate (from boric acid), phosphate (from phosphoric acid), sulfate (from sulfuric acid), or mixtures thereof, and also including ammonium salts thereof, are preferred inorganic counter-ions. Citrate (from citric acid), acetate (from acetic acid and/or acetic anhydride), oxalate (from oxalic acid), malonate (from malonic acid), or mixtures thereof, and also including ammonium salts thereof, are preferred organic counter-ions. If carbonate is the sole anion, the process is similar to that described in commonly owned U.S. Pat. No. 6,646,147. In the current invention, there is at least one acid present in the leach liquor that is not carbonic acid.

In one embodiment, the aqueous leach liquor comprise a number of alkanolamines. Preferably, at least 51% and more, preferably at least 70%, for example at least 85% of the moles of alkanolamine are MEA, wherein remaining alkanolamines can be any alkanolamine that can combine with copper ions and MEA to form a soluble, stable complex. By stable we mean the aqueous dissolved copper product having an initial dissolved copper concentration between 80 and 130 grams per liter, preferably from 100 to 120 grams per liter, will retain in solution at least 95% of the original dissolved copper after being stored for 2 months at 110° F. when a tank is opened to atmosphere and then sampled six hours later. In another embodiment, the aqueous leach liquor comprises an alkanolamine and ammonia. If ammonia is present, advantageously the moles of alkanolamine(s) to ammonia range from 100:0.1 to 4:3, for example from 100:1 to 5:1. Again, the alkanolamines can include any alkanolamines that can combine with the copper, the ammonia, and the other alkanolamines (if any) to form a soluble, stable complex. Preferably, at least 51% and more, preferably at least 70%, for example at least 85% of the total moles of alkanolamines and ammonia is MEA, wherein remaining alkanolamines can be any alkanolamine that can combine with copper ions and MEA to form a soluble, stable complex.

The aqueous leach liquor comprises at least about 0.05 equivalents of acid per total equivalents of alkanolamines and ammonia during dissolution. The aqueous leach liquor preferably comprises between 0.1 and 0.8 times equivalents of acid per total equivalents of alkanolamines and ammonia during dissolution, where the acid combines with a portion of the alkanolamines to form an alkanolammonium salt. The total equivalents of acids added to the aqueous leach liquor before and/or during the dissolution of copper metal is beneficially 0.05 to 0.7 times, preferably from 0.2 to 0.7 times, e.g., from 0.3 to 0.5 times the total equivalents of alkanolamines (and ammonia if any) present in the leach liquor. Again, lesser quantities of acid can be present early in the dissolution process. For example, the dissolution test providing the excellent dissolution rates shown in FIG. 8 was performed with an aqueous leach liquor containing about 2% carbon dioxide and about 46% MEA, which has about 0.12 equivalents of acid per mole of MEA. In one preferred embodiment, the total acid equivalents of the product, having at least 80 grams of dissolved copper and preferably between 100 and 130 grams of dissolved copper per liter, are between 0.3 and 0.58 of the total moles of alkanolamines (and ammonia if present).

The counter-ions are typically added as the acid form. However, if some fraction of ammonia is desired to be used as a partial replacement for alkanolamines, then ammonium salts or alkanolamine salts of the acid can be added. This is advantageous because the addition of acid to the aqueous leach liquor is exothermic, and during the process when copper dissolution is rapid (e.g., greater than 10 grams per liter per hour), then removing heat from the composition is a limiting factor. If the ammonium salts are added to the aqueous leach liquor as opposed to acids, there is little heat generated by admixing the ammonium salts with the aqueous leach liquor. Similarly, the acid can be admixed with alkanolamine prior to admixing the combination into the aqueous leach liquor, so that heat generated on mixing the two components can be removed before adding the mixture to the aqueous leach liquor. Of course, when acid is combined with either alkanolamines or ammonia, substantial heat is generated. However, if this heat is generated in a composition exterior to the dissolution vessel, the small added stream can be easily cooled as needed prior to admixing the ammonium salts and/or alkanolammonium salts with the aqueous leach liquor.

A portion of the counter-ions can be added as a salt, e.g., monosodium phosphate, sodium sulfate, etc, but such use of salts (except ammonium and alkanolamine salts) is discouraged, as salt in wood treated with the product of this invention encourages corrosion of metal fittings, and may increase the leach rate of copper from wood.

The amount of counter-ion present can be roughly monitored by the pH of the composition. Advantageously the counter-ions are present in the final product in an amount to provide about 2 equivalents for every 3.5 to 4 alkanolamines. For example, if sulfate from sulfuric acid is the counter-ion, the molar ratio of sulfate to total MEA is advantageously about 1:3 to about 1:4.5, for example about 1:3.5 to about 1:4. The acid providing the counter-ions can be added to the initial aqueous alkanolamine composition prior to beginning the copper dissolution process. Dissolution of copper is faster at higher pH within the range of 9 to 12.5, and a faster process is generally more economical. Since the amount of acid and MEA in the product is generally fixed, to maintain a high pH during dissolution, it is advantageous to start with an aqueous leach liquor that is deficient in acid, and then add acid as the process proceeds, either continuously or intermittently. For example, at the beginning of a batch dissolution process an aqueous leach liquor may contain for example a divalent acid and MEA, where the mole ratio of the divalent acid to MEA is between 0.1:3.5 to 0.8:3.5. Alternatively, for example, at the beginning of a batch dissolution process an aqueous leach liquor may contain for example a trivalent acid and MEA, where the mole ratio of the trivalent acid to MEA is between 0.066:3.5 to about 0.53:3.5 e.g., between one fifteenth to more than one half of the boric acid anticipated to be incorporated into the final product. As the dissolution progresses, the pH may rise, and additional acid can be added. If the amount of acid present initially is higher than 1 mole of divalent acid per 3.5 moles of MEA, then as dissolution progresses the pH may decline, and additional MEA can be added. As the dissolution process proceeds, additional alkanolamines and/or acid can be added to maintain the pH within the range of 8 to 13, for example from 9 to 12.5 or from 9.5 to 12.5. In one preferred embodiment, the pH is from 10 to 12.

Preferably the acids are added to the aqueous leach liquor before and/or during the copper dissolution process. If, for example, the desired product comprises both borate and carbonate counter-ions, the necessary amount of borate can be added to the initial composition. Carbon dioxide can be added continuously, for example by being included in the air or oxygen-containing gas used as an oxidant, or intermittently, for example to control the pH of recycled composition. For example, a composition may have MEA as the alkanolamine and both borate and carbonate as counter-ions, for example at a molar ratio of about 3.5 MEA/0.7 borate/0.3 carbonate in the finished product, where the process began with no carbonate in the aqueous leach liquor, but carbonate was added as the process progressed and the available borate might be complexed as $Cu(H-MEA)(MEA)_{1.5}BO_3$ depending on pH.

As the borate is complexed into product, the active components in the aqueous leach liquor may become primarily MEA and $(HMEA)_2CO_3$, the leach liquor being produced by partially carbonating the MEA. In a less preferred embodiment, dissolution of copper is done with only one counter-ion present, and then as the dissolution process is nearing or at completion, a second acid is added to the aqueous leach liquor.

The most preferred acids are acetic acid, citric acid (primarily because it is used in a commercial product), oxalic acid, sulfuric acid, phosphoric acid, boric acid, and carbonic acid. The composition of the aqueous leach liquor is written in terms of the components that are added or that could be added together to form the aqueous leach liquor. For example, carbonate concentrations are given as weight percent carbon dioxide, though the amount of actual carbon dioxide in the aqueous leach liquor may be vanishingly small as carbon dioxide reacts with water to form carbonic acid, which then combines with alkanolamines to form alkanolammonium carbonates. With the exception of carbonates, the concentration of the cations, unless otherwise specifically stated, is provided as the quantity of the corresponding acid added to the aqueous leach liquor. Beneficially, the aqueous leach liquor comprises, as the copper is being dissolved, at least about 0.5% of a first acid selected from the group consisting of citric acid, oxalic acid, sulfuric acid, phosphoric acid, boric acid, or carbon dioxide, or mixture thereof, and at least 1% of one or more additional organic acids, mineral acids, or combinations thereof, including but not limited to those already mentioned, oxalic acid, malonic acid, acetic acid, formic acid, propionic acid, hydrochloric acid, hydrofluoric acid, acidic boride, hydrobromic acid, nitric acid, fluoroboric acid, or any mixtures thereof.

It is often advantageous to have two or more counter-ions present in the final product. In one embodiment a first counter-ion is a carbonate, while the second counter-ion can be any soluble organic or inorganic anion, for example, borate, citrate, oxalate, malonate, acetate, formate, propionate, ascorbate, chloride, fluoride, boride, bromide, sulfate, phosphate, nitrate, fluoroborate, or any mixtures thereof. Carbonate can be added in the form of carbon dioxide gas, which is highly soluble in an aqueous alkanolamine composition. It is preferred that the equivalents of the carbonate (carbonic acid) comprise at least 20%, for example, at least 50%, of the equivalents of the total acid added to the aqueous leach liquor.

In one embodiment a first counter-ion is a borate, while the second counter-ion can be any soluble organic or inorganic anion, for example, carbonate, citrate, oxalate, malonate, acetate, formate, propionate, ascorbate, chloride, fluoride, boride, bromide, sulfate, phosphate, nitrate, fluoroborate, or any mixtures thereof. Boric acid can be added in the form of $H_3BO_3$, metaboric acid $HBO_2$, pyroboric acid $H_2B_4O_7$, boric oxide $B_2O_3$, or ammonium salts thereof, or combinations thereof, but the concentration is given as percent $H_3BO_3$. It is preferred that the equivalents of the borate comprise at least 20%, for example at least 50%, of the equivalents of the total acid added to the aqueous leach liquor.

In one embodiment a first counter-ion is a sulfate, while the second counter-ion can be any soluble organic or inorganic anion, for example borate, carbonate, citrate, oxalate, malonate, acetate, formate, propionate, ascorbate, chloride, fluoride, boride, bromide, phosphate, nitrate, fluoroborate, or any mixtures thereof. Sulfate can be added in the form of sulfuric acid, monoammonium sulfate, di-ammonium sulfate, fuming sulfuric acid, $SO_3$ or $SO_2$ gas, or combinations thereof, but the concentration is given as percent $H_2SO_4$. It is preferred that the equivalents of the borate comprise at least 20%, for example at least 50%, of the equivalents of the total acid added to the aqueous leach liquor.

In one embodiment a first counter-ion is a citrate, while the second counter-ion can be any soluble organic or inorganic anion, for example borate, carbonate, sulfate, oxalate, malonate, acetate, formate, propionate, ascorbate, chloride, fluoride, boride, bromide, phosphate, nitrate, fluoroborate, or any mixtures thereof. Citrate can be added in the form of citric acid, monoammonium citrate, or combinations thereof, but the concentration is given as percent citric acid. It is preferred that the equivalents of the citrate comprise at least 20%, for example at least 50%, of the equivalents of the total acid added to the aqueous leach liquor.

In one embodiment a first counter-ion is a phosphate, while the second counter-ion can be any soluble organic or inorganic anion, for example borate, carbonate, citrate, oxalate, malonate, acetate, formate, propionate, ascorbate, chloride, fluoride, boride, bromide, nitrate, fluoroborate, or any mixtures thereof. Phosphate can be added in the form of phosphoric acid, monoammonium phosphate, di-ammonium phosphate or combinations thereof, but the concentration is given as percent $H_3PO_4$. It is preferred that the equivalents of the phosphate comprise at least 20%, for example at least 50%, of the equivalents of the total acid added to the aqueous leach liquor. Phosphate ions will react with copper during subsequent use as a preservative, which should beneficially reduce copper leaching from wood treated with the product, compared to the leaching which would be observed if the counter-ions were sulfate, for example.

In one embodiment a first counter-ion is an acetate, while the second counter-ion can be any soluble organic or inorganic soluble anion, for example borate, carbonate, citrate, oxalate, malonate, formate, propionate, ascorbate, chloride, fluoride, boride, bromide, sulfate, phosphate, nitrate, fluoroborate, or any mixtures thereof. Acetate acid can be added in the form of acetic acid, acetic anhydride, or mixture thereof, though concentrations are given as percent acetic acid. It is preferred that the equivalents of the acetate comprise at least 20%, for example at least 50%, of the equivalents of the total acid added to the aqueous leach liquor.

The speed of dissolution is critical to economic usefulness. Prior art methods typically had average dissolution rates on the order of less than 1 gram copper per liter per hour. The method of U.S. Pat. No. 6,646,147 described a process where the copper dissolution rate was between 7 to over 20 gram copper per liter per hour. Certain preferred embodiments of the current invention can achieve dissolution rates of 17 to 40 gram copper per liter per hour, for example maintain a copper dissolution rate between 17 and 30 grams copper per liter per hour for at least 5 consecutive hours. The process can be carried out at any convenient temperature, for example from about 25° C. to about 100° C. The process can be carried out at near ambient temperature, e.g., between 15° C. and 25° C., if the reactor can be used for several days, say about 48 hours or less, to dissolve between about 100 and 130 grams of dissolved copper per liter of aqueous leach liquor. The average copper dissolution rate in the 48 hour variant of the invention is greater than about 2.1 grams of copper per liter of aqueous leach liquor per hour. Such low speeds, however, are not preferred embodiments of the invention, and a process can be competitive only if the average dissolution rates is at least twice that, e.g., at least 4.2 grams of copper per liter of aqueous leach liquor per hour.

A major advantage to the process of the current invention, however, is to provide a product having at least about 100 grams of dissolved copper per liter in 12 hours or less. Such a process requires average dissolution rates of greater than about 8.3 grams of copper per liter of aqueous leach liquor per hour. More preferably, the most preferred embodiments of the invention provide a product having at least about 100 grams of dissolved copper per liter in 8 hours or less. Such a process requires average dissolution rates of greater than about 12.5 grams of copper per liter of aqueous leach liquor per hour. A process that takes six hours or less is most preferred, as a batch can be prepared, processed, and shipped in a normal 9 hour work-day. Such a process requires average dissolution rates of greater than about 16 grams of copper per liter of aqueous leach liquor per hour.

We have found that the copper dissolution rate is slow at the beginning and at the end of the dissolution process, and is faster in the intermediate portion of the process. The key to obtaining a product in 4 to 6 hours is minimizing the slow start-up and the slow finish.

The copper dissolution rate is faster at higher temperatures (within the stated range) at the start-up, at the end of the process, and at the intermediate portion of the process. Temperatures between 93° C. and 140° C. can provide very high rates of dissolution, but the process would be relatively dangerous due to required pressures and heat, and the composition would be above the flash point temperature of MEA. Generally, the process is carried out at temperatures below about 93° C., more preferably below about 90° C. Advantageously the process is carried out at an elevated temperature, for example from 30° C. to about 90° C., preferably from 40° C. to 80° C., alternatively from about 45° C. to about 65° C. or from about 60° C. to about 85° C.

If an aqueous leach liquor at room temperature is added to a copper mass also at room temperature, the dissolution rate will be very slow, e.g., in the range of a gram of copper per liter of aqueous leach liquor per hour. Such a slow reaction rate may not generate sufficient heat to sufficiently raise the temperature of the aqueous leach liquor into the preferred ranges, which would assure a faster reaction and generation of sufficient heat to achieve even higher temperatures. Therefore, the aqueous leach liquor and copper must usually be heated at the beginning of a batch process, and then heat must be withdrawn from the system as copper dissolution proceeds. The simple process of adding acid to alkanolamine generates some heat. The initial heating can be at least partially accomplished by admixing a portion of the acid, for example between one tenth to all of the total moles of acid to be added, typically from three tenths to eight tenths of the total moles of acid to be added, with the aqueous alkanolamine composition to form the aqueous leach liquor. The heat resulting from the initial addition of acid to aqueous alkanolamine advantageously is used to pre-heat the resulting aqueous leach liquor and the copper. Typically, additional heat may be added in the early stages of the process to further increase the temperature, for example using a heat exchanger. Advantageously the heat exchanger can also remove heat, and is used to withdraw heat when copper dissolution exceeds a moderate value, e.g., about 5 to 10 grams of copper per liter aqueous leach liquor per hour. Heat will need to be withdrawn to prevent the reaction temperature from exceeding the predetermined level, e.g., 65° C. or 80° C.

Generally, it is also advantageous to add a quantity of dissolved copper to the initial leach liquor. We have surprisingly found that the copper dissolution rates remain low even in pre-heated aqueous leach liquor until the aqueous leach liquor builds up some critical level of copper. Without being bound by theory, the copper(II) ions in the aqueous leach liquor may react with copper metal to create copper(I) ions, which are in turn rapidly oxidized by the air into copper(II) ions. The copper dissolution rate in an aqueous leach liquor is low until the copper concentration reaches some value, and this value is between 1 gram to 17 grams of dissolved copper per liter. This critical concentration, which may be for example between 2 to 10 grams of dissolved copper per liter of aqueous leach liquor, can be reached by allowing the pre-heated aqueous leach liquor to react with oxidant and copper for a period of 30 minutes to 4 hours (depending on temperature, flowrates, and other criteria). Alternatively, an initial dissolved copper concentration can be immediately established in the fresh aqueous leach liquor if some residual product, e.g., 2% to 6%, is left in the reactor. This can often not be avoided as it is often difficult to remove product from flow lines, pumps, and partially isolated parts of the system.

It is necessary to have sufficient surface area of copper available to maintain high rates. The copper surface area contacting the leach liquor in the reactor should be at least 0.001 $m^2$ per liter of aqueous leach liquor, and is preferably at least 0.01 $m^2$ per kilogram of copper mass. The high surface area can be provided by providing the copper as wire, blister copper, or blister shot, provided a sufficient excess of copper is present. A surface area of between about 0.1 $m^2$ and 10 $m^2$ per kilogram of copper mass is highly advantageous. Alternatively, higher circulation rates and more turbulence in the reactor can be used to provide high dissolution rates. It is generally less expensive to use moderate recycle rates and to have a large excess of copper having modest surface area, e.g., 0.05 to 0.5 $m^2$ per kilogram, present in the reactor. Alternatively or additionally, a fast startup can be achieved if a portion of the copper mass is in a form which is both permeable to leach liquor and air, and which has a very high surface area, for example greater than about 2 $m^2$ per kilogram of copper mass, typically between 10 and 500 $m^2$ per kilogram. The very high surface area will promote a faster initial reaction rate. The amount of such copper mass having a very high surface area need only be about 3 to 15 grams of copper per liter of aqueous leach liquor, as once this very high surface area per kilogram copper begins to dissolve, the kinetics of dissolving copper metal having lower surface area is increased significantly. However, use of very high surface area copper for the majority of the copper to be dissolved is discouraged. While high kinetics can be obtained with copper powder, such material can have a higher feedstock cost than copper carbonate feed used in the prior art.

Alternatively or additionally, a fast startup can be achieved if the amount of oxygen in the air sparged through the reactor is increased, to say at least 25%, or to at least 30%.

There may be more than one dissolution reactor. Heating the composition from ambient to at least about 40° C. using fuel can be very expensive. In an alternative embodiment, a small heated dissolution reactor can be used to preheat some aqueous leach liquor, and beneficially will this heated leach liquor will dissolve some copper and become even hotter, to say a temperature between about 60° C. and 90° C. This partially used and heated leach liquor can be added to an existing reactor containing additional leach liquor and copper mass, and the process of this invention can proceed. The amount of leach liquor from the heated reactor is generally less than 20% of the total leach liquor, say between 3% and 10% of the total leach liquor. The heated leach liquor from the small reactor will provide heat to the larger body of leach liquor and copper mass in the regular reactor, and will also provide an initial low concentration of dissolved copper in the leach liquor, both of which will make the process in the larger reactor react faster.

The process can be carried out in two reactors, using appropriate heat exchangers to transfer heat from a process in a first tank that is dissolving copper at a rapid rate, e.g., greater than 10 grams copper per liter per hour, to the leach liquor and copper mass in a second reactor which is at startup and needs input of heat. Design and operation of the heat exchangers, and operation of the schedules to permit loading of copper mass and leach liquor and subsequent heating, is within the skill of one of ordinary skill in the art having benefit of this disclosure.

Any combination of the above-described methods to provide a high initial copper dissolution rate, e.g., adding some leach liquor containing dissolved copper to the initial charge of leach liquor, having some copper mass having a permeability and a high surface area to mass ratio, heating, adding oxygen to the air sparge, and higher circulation rates and more turbulence in the reactor, can be used. If the leach liquor dissolves at least 10 grams of copper in the first hour of operation, the end product can usually be reached in under 8 hours, say in about 6 to about 8 hours.

According to the preferred embodiments of the process, a MEA-based copper-containing solution comprising between 100 and 130 grams per liter of dissolved copper per liter may be produced in 8-12 hours or less, more usually within about 8 hours or less, for example in 4 to 6 hours, from an initial aqueous leach liquor that comprised less than about 10 grams of dissolved copper per liter.

Another critical aspect of the invention is not allowing the surface area of the available copper to fall to such a low level that the desired reaction rate can not be maintained. The desired end product comprises 90 g/l to 140 g/l, and preferably 100 g/l to 130 g/l of dissolved copper in the copper-containing solution product. Advantageously there is a large excess of copper available, such that the loss of copper surface area does not unduly restrict the dissolution rate during the later stages of dissolution, e.g., when the solution has already dissolved more than 80 g/l copper. Advantageously, there is at least 200 grams, preferably at least 400 grams, for example between 500 grams and 5 kilograms of copper mass in the reactor per liter of aqueous leach liquor. In addition to providing a higher available surface rate at the beginning of the process, the excess copper mass will help maintain copper dissolution rates as the leach liquor dissolves the copper. If 500 grams of copper are initially present per liter of aqueous leach solution, then the surface area will generally only decline between 10% and 50% as 100 grams per liter of this copper mass is dissolved, and this will help mitigate the slower dissolution rates as the available MEA is reduced. There is no maximum amount of copper mass that can be added to the reactor. At loadings such as 5000 grams (or more) of copper mass per liter of aqueous leach liquor, the dissolution of 100 grams copper mass into each liter of leach solution will not reduce the copper surface area by a significant amount, but the only downside is the reactor size gets progressively larger, and support structures need to be stronger, to contain and support the excess copper.

A batch process advantageously has an average dissolution rate in excess of 10 grams per liter per hour. The dissolution rate is more advantageously in excess of 17 grams per liter per hour, preferably in excess of 20 grams per liter per hour, for an aqueous leach liquor until the dissolved copper content of the aqueous leach liquor reaches about 80% of the theoretical maximum amount as copper(II) complexes, which is about 1/3.5 times the total concentration of MEA, or 100 grams per liter, whichever is lower.

A high initial dissolution rate, e.g., greater than 8 grams copper dissolved per liter leach liquor in the first hour, will generally allow with normal process conditions the product to be produced in under 12 hours. To reduce time from start of the reaction to obtaining the product to below 8 hours may require additional steps, especially if the end product has between 120 and 130 grams of dissolved copper per liter of product. Generally, the dissolution rate declines as the amount of dissolved copper increases to 100 g/L copper or above, and it may be difficult to maintain rates above 10 grams per liter per hour in aqueous MEA leach liquors having more than 100 grams dissolved copper per liter. However, it is advantageous to load the aqueous leach liquor with near the maximum amount of dissolved copper possible, to utilize the available alkanolamine, e.g., MEA. Therefore, in one embodiment, the temperature is allowed to increase as the leach liquor passes 100 grams of copper per liter to near the maximum temperature in the range. Alternatively or additionally, the oxygen content of the sparging gas can be increased.

Alternatively, a product containing between about 100 and 130 grams of dissolved copper is made in two steps, wherein the first step occurs in a reactor having greater amounts of air flow and is terminated after the copper concentration exceeds, for example, 90 grams, or 100 grams, or 110 grams per liter. Then, the rates of addition of oxidant can be reduced, for example by 50%, and the aqueous leach liquor can continue to dissolve copper at the slower rate. The mixing (providing turbulent flow of leach liquor against the copper mass) and temperature maintenance can also be reduced during this second stage. To maximize plant facilities, it may be desirable to transfer the aqueous leach liquor to a second reactor providing a less vigorous oxidant addition, where the slower dissolution can occur in a less energy-consuming process using a simpler reactor design that is less expensive to operate.

In a variant of this two-step process, the fast dissolution process can be followed by a period of time where the reaction rate is greatly reduced, which has the side benefit of allowing the reactor to cool, e.g., overnight. To conserve energy and to lower the reaction rates, the amount of oxygen being sparged through the reactor can be reduced, to say between about 0.01 to about 0.2 SCF air per gallon of leach liquor. The reduced rate of sparging will conserve energy, and also lack of oxygen will further slow the reaction and allow the leach liquor to cool. The circulation rate can be reduced, and/or heat can be withdrawn at a rate faster than it is withdrawn during the intermediate portions of the process. Therefore, while the reaction proceeded to give a product in less than 12 hours, simply circulating the reactants while allowing the reactor, the copper mass, and the leach liquor to cool, can extend the process and more efficiently load the leach liquor with dissolved copper with little downtime that would not be experienced simply to cool the reactor, replenish the copper mass, and prepare for the next batch.

The most effective reactor design is a packed tower. In such a tower, copper mass fills a tower for a substantial height, usually more than 50% of the height, and optionally more than 75% of the height. The copper is advantageously active, which means the surface is clean and is substantially free of oxides and such which may impair copper dissolution. Copper mass can be activated by a simple wash with an acid. As previously described, this acid wash can advantageously form part of the leach liquor. The copper mass may be distributed on plates (not shown) disposed within the tower, or the copper mass may be simply piled up to fill the tower. It is not practicable to stir the leach liquor with this solids loading, so generally the leach liquor is circulated in the reactor. Circulation is preferably vertical, either in an upward direction or in a downward direction. While countercurrent flow can most effectively remove gases from a liquid, it is not critical to utilize all the oxygen in the oxidant gas.

Generally, the reactor should have an opening allowing easy access so that copper mass can be added thereto. The copper mass can be pre-treated to make the surface more active.

BRIEF DESCRIPTION OF THE DRAWINGS

The present invention will now be described in more detail with reference to the accompanying drawings, in which.

DETAILED DESCRIPTION OF THE INVENTION

Unless otherwise specified all percents (%) are weight percent.

The alkanolamine(s) advantageously comprise, consists essentially of, or consist of MEA. Other alkanolamines, e.g., diethanolamine, isopropanolamine, and others, can be used, but these other alkanolamines generally cost more than MEA and also have slower dissolution kinetics than does MEA. Generally, if aminoalkanols other than MEA are used, the composition comprises a plurality of alkanolamines wherein at least half, preferably at least 75%, of the moles of the total alkanolamines are MEA.

The gas comprising molecular oxygen can be air, oxygen, or a mixture of oxygen and air. The oxidant advantageously comprises, consists essentially of, or consists of molecular oxygen, which can be provided in the form of a gas comprising molecular oxygen, e.g., air. Other oxidants include for example weak organic oxidants such as hydrogen peroxide, and trace amounts of ozone can be included in small amounts, e.g., 0.1%, to help clean the copper mass and also to initiate the oxidation process. To get the reaction started quickly, the oxidant may be oxygen-enriched air, having for example from 20 to 40 mole percent oxygen. Air, or air supplemented with between 0.1% and 10% by volume oxygen, is the preferred oxidant due to its cost and safety. The oxidant is advantageously added as a gas. During the high dissolution rate portion of the process, e.g., when the amount of dissolved copper is between about 10 and about 100 grams of copper per liter of aqueous leach liquor, the amount of oxygen enrichment can be reduced or eliminated. As the amount of dissolved copper exceeds 100 grams per liter of leach liquor, oxygen enrichment of the gas may help keep copper dissolution rates up.

The dissolution process can take place at any pressure, e.g., from about 12 psia to about 150 psia. While operation under pressure will increase the oxidation rate, it is generally preferable to operate the dissolution process at near atmospheric pressure to keep the cost of the reactor to a minimum. Generally, it is preferred that the oxidant be added to a packed column having copper mass and an aqueous alkanolamine composition, such that the oxidant bubbles or sparges upward through the composition contacting the copper mass. The oxidant will therefore be added at a slight pressure to overcome the hydrostatic pressure of the composition above the oxidant inlets. The reactor can also have some positive pressure to allow treatment of exiting gas. Therefore, the oxidant may be added at a positive pressure, e.g., between about 0.1 to about 20 psig, for example from about 0.3 to about 10 psig.

Figure 1:
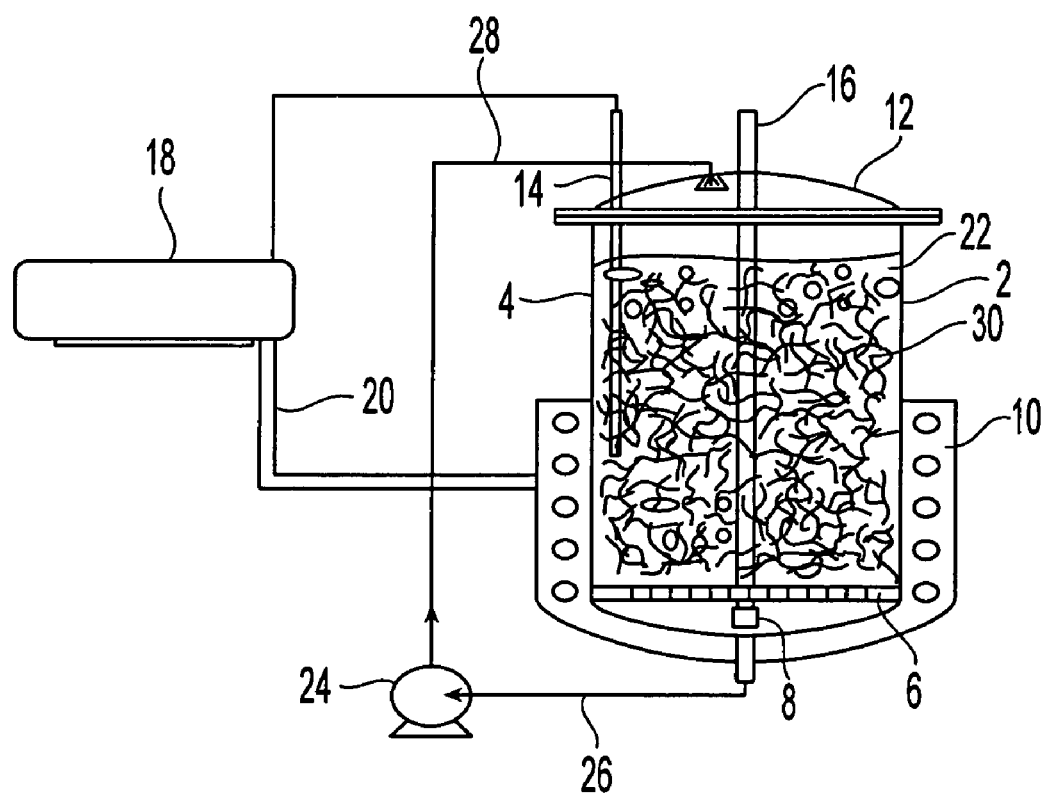
FIG. 1 is a schematic depiction of a batch dissolver to be used for performing the present invention in a batch-wise manner.

Referring to FIG. 1, there is shown a batch reactor (also called a dissolver), generally referenced 2, having a chamber 4, with a false bottom 6, and an air sparger 8 located below the false bottom. The chamber is surrounded by a heating coil 10 and has a top 12 through which extend a thermocouple 14 and an air inlet 16. The thermocouple is connected to a temperature control unit 18 and supplies heat to the heating coil 10 through conduit 20. Leach liquor 22 is circulated through the chamber by circulation pump 24 through lines 26,28. In the embodiment shown, the aqueous leach liquor flows in an upward direction. Copper metal 30, typically scrap copper, is present in the chamber and immersed in the leach liquor to enable the dissolution to occur.

The invention also includes embodiments where the aqueous leach liquor is a film flowing down through the copper. In such a case, the amount of aqueous leach fluid may not be sufficient to form a liquid phase where gas can only pass through as bubbles. Alternatively, the aqueous leach liquor may only cover the copper when the aqueous leach liquor contains entrained oxidant gas.

The term "copper" as used herein means copper metal, including scrap copper, such as, for example, copper wire, copper clippings, copper tubing, copper cabling and/or copper plate, compounds of copper, such as copper oxide, and/or mixtures of copper metal and copper compounds. The term "copper mass" as used herein refers to copper metal in a form which, when present in the chamber, is permeable to the leach liquor and which presents high surface area for contact with the leach liquor to thereby expedite dissolution of the copper. A bale may have a volume of for example about 25-100 cubic feet. Advantageously, there is at least 4 square feet, preferably at least 10 square feet, of available surface area per bulk cubic foot of copper mass (or per cubic foot of the bale). The copper mass may be present for example as a three-dimensional open permeable network, such as a bale of scrap copper comprised of copper wire, copper tubing, copper cabling, copper plates, providing voids between the copper pieces to allow free flow and maximum contact of the leach liquor with the copper. The copper mass may be present in the chamber as smaller irregular shaped pieces resembling "popcorn" ("blister shot") having an average dimension of about 1-3", which allow for good permeation of the leach liquor between and around the copper pieces to expedite dissolution thereof. The copper mass advantageously includes one or more of copper saddles, bent coins, popcorn, irregularly shaped spheres, spheres, wire, tubing, blister shot, bent rods, and the like. The key is to provide an open network of copper with a high surface area, so the aqueous leach liquor can permeate the copper mass and the dissolution rate can be maximized. Closely packed regularly shaped copper may be too impermeable to support rapid dissolution.

In one embodiment the ratio of copper surface area to volume of leach liquor is about 10:1 to 20:1 (e.g., in units of $cm^2$ and $cm^3$). There is no upper limit on the amount of copper mass, and in one embodiment the ratio of copper surface area to volume of leach liquor (e.g., in units of $cm^2$ and $cm^3$) is about 20:1 to 200:1. Typically, the ratio of copper surface area to volume of leach liquor for this process versus a standard agitated reactor is about 10-20:1, for example about 15:1. The amount of copper in the reactor is also advantageously at least 10 to 20 times the amount of copper found in a standard reactor.

According to the process, the copper mass is dissolved in the presence of an oxidant in an aqueous leach liquor containing an alkanolamine and an alkanolammonium-anion complex, for example MEA and a monoethanolammonium anion complex, e.g., one or more of $H(HMEA)_2BO_3$, $(HMEA)_3BO_3$, $(HMEA)_2SO_4$, $H(HMEA)_2PO_4$, $(HMEA)_2Cl_2$, $(HMEA)_2F_2$, $(HMEA)_2(NO_3)_2$, $(HMEA)_2CO_3$, $H(HMEA)CO_3$, $H(HMEA)_2$ citrate, $(HMEA)_2$ oxalate, $(HMEA)_2$ malonate, or mixtures thereof. Carbonate (from carbonic acid), borate (from boric acid), phosphate (from phosphoric acid), sulfate (from sulfuric acid), or mixtures thereof, are preferred inorganic counter-ions. Citrate (from citric acid), acetate (from acetic acid and/or acetic anhydride), oxalate, malonate, or mixtures thereof are preferred organic counter-ions.

As previously stated, the preferred oxidant is air, or a gas comprising molecular oxygen. Generally, only one mole of oxygen ($O_2$) is needed to oxidize and dissolve two moles of copper mass, so a dissolution rate of 30 grams of copper per hour per liter requires about one cubic foot of air per hour per liter of aqueous leach liquor. However, as a practical matter, only a fraction of the molecular oxygen introduced to a reactor is utilized. Typically, for a 1 liter chamber, the air flow SCF/H ranges from about 2 to 20, for example 3 to 10, standard cubic feet of air per hour per liter of aqueous leach liquor. Typical air sparging rates in larger systems, which are generally more efficient at utilizing available oxygen, are between about 0.2 and about 2 standard cubic feet of air per hour per liter of aqueous leach liquor, for example between about 0.5 and about 1.5 standard cubic feet of air per hour per liter of aqueous leach liquor. The downsides of passing excess air through the reactor are system heat is lost through evaporative and contact cooling from the air; a small amount of energy is needed to compress and move the air, and the air must be scrubbed prior to releasing it to the environment. Scrubbing the air that has passed through the reactor, to remove entrained ethanolamines, can be done with any effective aqueous acid formulation, for example an aqueous composition of the acid used as counter-ions in the process. It is well within the skill of one of ordinary skill in the art to design recycle systems to minimize emissions. The air flow SCFH will increase as the volume of the chamber increases, but efficiency of transfer of oxygen from the sparged gas will also increase as the contact time and pressure are increased. For a 11,500 gallon vessel, which may comprise between 20% and 35% of its volume as copper mass and between 48% and 66% of its volume as aqueous leach liquor, for example, representative air flow rates can be between 6000 and 40,000, typically between 12,000 and 24,000, standard cubic feet per hour. The important factor is the oxygen flow rate, and total gas rates can be reduced if the sparged gas contains more oxygen than does air, for example, if an oxygen-enriched air was used for sparging. The gas flow rate should be sufficient to provide at least a small excess, say about 25% to 75%, more oxygen than is needed to oxidize the copper. More efficient utilization of oxygen, resulting for example from greater pressure, greater air-liquid interface (i.e., smaller bubbles), and the like, will minimize air utilization and/or increase dissolution rates. Smaller bubbles will increase oxygen transfer from the bubbles to the leach liquor. Higher oxygen content will also increase the dissolution rates over air sparging, but the increase is often not justified by the added expense and safety concerns associated with the handling of oxygen and oxygen-enriched gas.

Usually, the leach liquor is produced externally of the chamber and introduced into the chamber into contact with the copper as required, and the leach liquor is recirculated as necessary. If the counter-ion(s) comprise carbonate, the leach liquor is produced by partially carbonating the MEA by sparging or bubbling carbon dioxide through the aqueous MEA, and the leach liquor may be generated externally of the reactor or in situ in the reactor through the addition of carbon dioxide to the aqueous MEA-based leach liquor. To maximize the dissolution of copper, it is important that the aqueous leach liquor move past the copper and is most beneficial if a turbulent manner is used to reduce the effects of diffusion on the dissolution process. Stirring is impractical with such a large loading of copper. The turbulence can be provided by the air sparging, but beneficially the aqueous leach liquor is also flowing past the copper surfaces. Such flow can be obtained by a circulating pump, which circulates the aqueous leach liquor, for example by withdrawing a portion of the leach liquor from the bottom of the reactor and re-introducing the aqueous leach liquor at the top of the reactor. The composition of the leach liquor can be monitored and adjusted during the circulation. The leach liquor may be supplemented during the dissolution process with one or more components as necessary to maintain the desired copper dissolution rates. The supplements most commonly needed are acids comprising the counter-ions, if the pH is too high, or additional alkanolamines, e.g., MEA, if the pH is too low. If the leach liquor is being circulated, the leach liquor may be tested and if necessary additional acid (e.g., boric acid, carbon dioxide, or both) can be added to the leach liquor, again either externally of the reactor or in situ in the reactor through addition of carbon dioxide to the MEA/water solution by sparging or bubbling.

The term "partially carbonating" as used herein means that the amount of carbon dioxide introduced during the process is controlled such that partial carbonation occurs to form a known concentration of $(HMEA)_2CO_3$. Preferably, the carbon dioxide is present in an amount of about 30% or less by weight, for example, about 20% or less, or about 12% or less by weight. The carbon dioxide may be present in an amount of at least 0.5% by weight, for example at least 5% or at least 8% by weight.

More generically, the process can be termed "partially complexing." As used herein, the term "partially complexing" means adding to an aqueous alkanolamine composition an acid component, thereby causing a portion of the alkanolamine to combine with the acid and to form an alkanolammonium-counter-ion complex, where the counter-ion is the anion of the acid. By a "portion" we mean the amount of acid added is sufficient to, at the pH of the composition, provide hydronium ions (H+) equal to at least 10% of the moles of alkanolamine. The exact ratio of acid to alkanolamine will depend on the particular acids and on the valence of the counter-ion. It is often advantageous to maintain a level of acid equivalent to between about 10% and about 40% of the moles of alkanolamine (plus ammonia, if any is present). For MEA, the amount of acid equivalents should be maintained at a level of at least 10%, for example 10% and about 40%, of the moles of MEA, but the amount of acid can be increased as the amount of dissolved copper approaches the concentration of the end product. The equivalent acid in the end product is beneficially between 40% and 70% of the moles of alkanolamine (plus ammonia if present). That is, the equivalents of acid added are between 0.4 and 0.7 times, preferably from 50 to 60%, the amount of MEA present.

The MEA is beneficially present in the aqueous leach liquor in an amount of 20 weight percent or more, for example, 30 weight percent or more, such as 35 weight percent or more. The MEA may be present in the aqueous leach liquor in an amount of 50 weight percent or less, for example 40 weight percent or less, for example, 38 weight percent or less. A preferred leach liquor comprises between 30% and about 45% by weight of the total MEA, e.g., between 34% to 38% by weight MEA. With respect to quantities, the quantity of MEA is the quantity of total MEA, which can exist as MEA, as an HMEA-anion complex, and as a copper-HMEA-MEA-anion complex.

The amount (in weight percent) of the acid depends on the molecular weight of the acid anion and on the valence of the anion (counter-ion) donated by the acid. An exemplary carbonate-based aqueous leach solution comprises about 30% to 50% MEA and 1% to 12% carbon dioxide, for example about 34% to 38% MEA and about 6% to 8% by weight carbon dioxide (which forms carbonic acid in water).

An exemplary boric acid-based aqueous leach solution comprises 30% to 50% MEA and 2% to 15% boric acid (as $H_3BO_3$), typically about 34% to 38% MEA and about 6% to 8% boric acid (as $H_3BO_3$). An exemplary citric acid-based aqueous leach solution comprises about 30% to 50% MEA and 5% to 25% citric acid, more typically 34% to 38% MEA and about 15% to 20% citric acid. An exemplary sulfuric acid-based aqueous leach solution comprises about 30% to 50% MEA and 5% to 20% sulfuric acid, more typically 34% to 38% MEA and about 12% to 17% sulfuric acid. An exemplary phosphoric acid-based aqueous leach solution comprises about 30% to 50% MEA and 4% to 20% phosphoric acid, more typically 34% to 38% MEA and about 8% to 12% phosphoric acid. An exemplary hydrochloric acid-based aqueous leach solution comprises about 30% to 50% MEA and 5% to 18% hydrochloric acid, more typically 34% to 38% MEA and about 10% to 14% hydrochloric acid. Generally hydrochloric acid is not preferred due to the likelihood of enhancing corrosion. An exemplary nitric acid-based aqueous leach solution comprises about 30% to 50% MEA and 10% to 25% nitric acid, more typically 34% to 38% MEA and about 15% to 22% nitric acid. Nitric acid is not preferred as the nitrate can encourage growth of certain mildews and molds. An exemplary fluoboric acid-based aqueous leach solution comprises about 30% to 50% MEA and 15% to 32% fluoboric acid ($HBF_4$), more typically 34% to 38% MEA and about 20% to 30% fluoboric acid. An exemplary oxalic acid-based aqueous leach solution comprises about 30% to 50% MEA and 5% to 25% oxalic acid, more typically 34% to 38% MEA and about 10% to 20% oxalic acid. Various acids can be combined, and the optimum quantity can be readily determined by one of ordinary skill in the art, having benefit of this disclosure, without undue experimentation.

The partially borated MEA complex of copper solution products are beneficially prepared by dissolving the copper mass in a $MEA/H_3BO_3/H_2O$ solution comprising or in the presence of an oxidant. The partially phosphated MEA complex of copper solution products are beneficially prepared by dissolving the copper mass in a $MEA/H_3PO_4/H_2O$ solution. The partially sulfated MEA complex of copper solution products are beneficially prepared by dissolving the copper mass in a $MEA/H_2SO_4/H_2O$ solution. The partially fluorinated MEA complex of copper solution products are beneficially prepared by dissolving the copper mass in a $MEA/HF/H_2O$ solution. The same is true for the other acids. It can be seen that a significant quantity of acids can be needed, depending on the acids selected. It is preferred that the processes of this invention comprise counter-ions that include carbonate, borate, or both, and optionally include one or more additional acids. In one embodiment, the aqueous leach liquor comprises between 1% and 15% boric acid. In one embodiment, the aqueous leach liquor comprises between 1% and 12% carbon dioxide, and at least 1% of a second acid.

The balance of the aqueous leach liquor, and optionally some trace compounds which may be optionally added to control precipitation of contaminants such as scales, to control foaming, and the like, is beneficially water.

The preferred alkanolamines are MEA, diethanolamine, and isopropanolamine. The most preferred alkanolamine is MEA. Exemplary useful alkanolamines include, for example, diglycolamine, 2-(N-methylamino) ethanol ("monomethyl ethanolamine"), 2-[(2-aminoethyl)-(2-hydroxyethyl)-amino]-ethanol ("N,N-bis-hydroxyethyl-ethylenediamine"), N,N,N-tris-(2-hydroxyethyl)-ammonia ("triethanolamine"), N-aminoethyl-N'-hydroxyethyl-ethylenediamine, N,N'-dihydroxyethyl-ethylenediamine, 2-[2-(2-aminoethoxy)-ethylamino]-ethanol, 2-[2-(2-aminoethylamino)-ethoxy]-ethanol, 2-[2-(2-aminoethoxy)-ethoxy]-ethanol, tertiarybutyldiethanolamine, diisopropanolamine, 3-amino-1-propanol ("n-propanolamine"), isobutanolamine, 2-(2-aminoethoxy)-propanol; 1-hydroxy-2-aminobenzene; or the like, or any combination thereof, or any combination thereof and including ammonia and/or any of the preferred alkanolamines. Generally, the cost of these components are prohibitive compared to MEA, as they typically have slower copper dissolution kinetics compared to MEA, and provide little if any benefit over MEA.

Another class of useful complexing compounds is ethylenediamine and ethylenediamine derivatives. Exemplary compounds include for, example, ethylenediamine, ethylenediamine diformic acid, and the like. Ethylenediamine is not preferred because it has is a fire hazard, having a flash point temperature of 93° F. compared to the flash point of MEA, which is 200° F. Similarly, ethylamine is too strong an irritant and fire hazard to be widely used.

For other alkanolamines, the amount of alkanolamine needed goes up about the same as the molecular weight of the alkanolamine increases relative to MEA. Typically, the total quantity of alkanolamines in the aqueous leach liquor is 20 weight percent or more, for example, 30 weight percent or more, such as 35 weight percent or more. The total alkanolamines may be present in the aqueous leach liquor in an amount of 55 weight percent or less, for example 45 weight percent or less, for example, 40 weight percent or less. A preferred aqueous leach liquor comprises at least 30% by weight MEA, with lesser amounts of other alkanolamines.

The alkanolamine complex of copper solutions are beneficially prepared by dissolving copper metal in an aqueous composition comprising MEA, an acid, and an oxidant, wherein the MEA is partially complexed with the counter-ion. The degree of complexing can be roughly monitored and controlled by measuring and controlling the pH. Advantageously the pH is between 8 and 13, for example between 9 and 12.5. Higher pH compositions generally provide faster dissolution kinetics. A preferred pH is 9.5 to 12.5. The pH of the leach liquor can drift as various ingredients are consumed, for example between 10.2 and 12.7, or between 11.7 and 12.2. Or, the pH can be controlled at a predetermined set-point, for example at pH 10, pH 10.5, pH 11, pH 11.5, or pH 11.9, for example. To control the pH, an acid or carbon dioxide is added if the pH is too high, and ammonia or an alkanolamine (or both) are added if the pH is too low. While the process includes adding ammonia (if any), alkanolamines, and acids as separate components, these components can be combined prior to admixing them with the aqueous leach liquor.

The dissolution may be carried out in a batch dissolver (see FIG. 1), or may be performed as a continuous process in towers packed with copper (see FIG. 4), or the process can be a hybrid of the two. Typically, the copper and MEA/acid/$H_2O$ solution are charged into the dissolver, and the circulation pump, air-flow and temperature controller are actuated. The amount of copper at the beginning of the process is at least 200 grams, preferably at least 400 grams, and typically between 1000 grams and 5000 grams per liter of aqueous leach liquor. The temperature is beneficially between 30° C. and 90° C., for example between 40° C. and 80° C. The aqueous leach liquor may be preheated to start the reaction, where after the dissolution rate exceeds a certain value, heat is beneficially withdrawn from the aqueous leach liquor to maintain the temperature within the desired range. The temperature may be held constant or may be allowed to drift within a pre-set range. Examples of conditions are given in Table 3 below.

The present inventors have discovered that it is not necessary to utilize precursors, such as copper carbonate, copper sulfate, copper borate, or the like which is expensive. The dissolution of the copper metal may be achieved in the presence of water, MEA, $(HMEA)_2$-(counter-ion), and an oxidant at preferably elevated temperature, without the need for the addition of ammonium compounds, such as ammonium hydroxide, fungicidal anions, polyamines, carboxylic acids, alkali metal hydroxides such as sodium hydroxide, and/or alcohol-based solvents.

It is not necessary to have ammonium compounds in the formulation. In one embodiment, however, between about 0.01% and about 50% of the moles of the alkanolamine, e.g., MEA, can be replaced with ammonia. The ammonia will function in a manner similar to the MEA. Generally, a copper ammonia carbonate complex imparts an inconsistent blue color to wood, and has much greater noxious vapor pressure (fuming problems) than a copper MEA carbonate complex. However, ammonia is less expensive than the MEA, and the copper ammonium carbonate complex has somewhat greater injectability into certain types of wood, e.g., spruce, than does a copper MEA carbonate complex. Replacement of a portion of the MEA with equal molar amounts of ammonia will provide a hybrid product at a reduced cost, with better color consistency and intermediate noxious vapor pressure.

There is no need to include fungicidal anions in the dissolution process. Nevertheless, the end use of much of the product is fungicidal in nature, so incorporating one or more fungicidal anions into the complexed material is useful. In a preferred embodiment, at least 10%, preferably at least 30%, more preferably at least 60%, of the moles of copper-alkanolamine-counter-ion complexes in a composition comprise fungicidal anions. Preferred fungicidal counter-ions include borate, fluoride, and fluoroborate. The remaining counter-ions can be carbonate, hydroxide, a fungicidal anion, or a non-fungicidal anion.

The leach solution may be re-circulated in the reactor. Re-circulation benefits the mass transfer and reaction rate. If performed, re-circulation may be implemented at a constant rate, and may be, for example, a constant rate of about 15 percent or less, for example, 10 percent or less of the leach liquor volume per minute. The recirculation may be performed at a rate of about 1 percent or more, such as 2 percent or more of the leach solution volume per minute. Recirculation rates are beneficially between $\frac{1}{50}$ and $\frac{1}{3}$, for example between about $\frac{1}{30}$ and $\frac{1}{10}$ of the leach liquor volume per minute. The process may be carried out at atmospheric pressure and at a temperature of 25-100° C., for example 30-90° C., alternatively from 45-65° C. The temperature may be maintained at 45-55° C. The pH may be maintained in a basic region, for example, greater than 7, for example at least 8, or at least 9. The pH may be less than 13, for example, about 12.5 or less. The pH may be maintained by addition of carbon dioxide or any other of the acids, preferably any of the preferred acids, or mixture thereof as acid, and by addition of MEA, or ammonia, or other alkanolamines, or mixture thereof as base.

The reaction may proceed slowly where there is a small surface area of copper available to, contact the leach solution. For example, if the contact area of the copper metal to leach solution is doubled, the rate of the process will be expected to double assuming adequate air-distribution. It has been found that an aerated packed tower containing copper metal and circulating leach liquor is the most preferred method for commercial purposes. The advantage of using a packed tower is that it maintains a relatively high surface area to solution volume of copper metal. According to another embodiment of the present invention, it is possible to utilize a reactor that contains a bed of copper and can be rotated while being heated and aerated.

Figure 4:
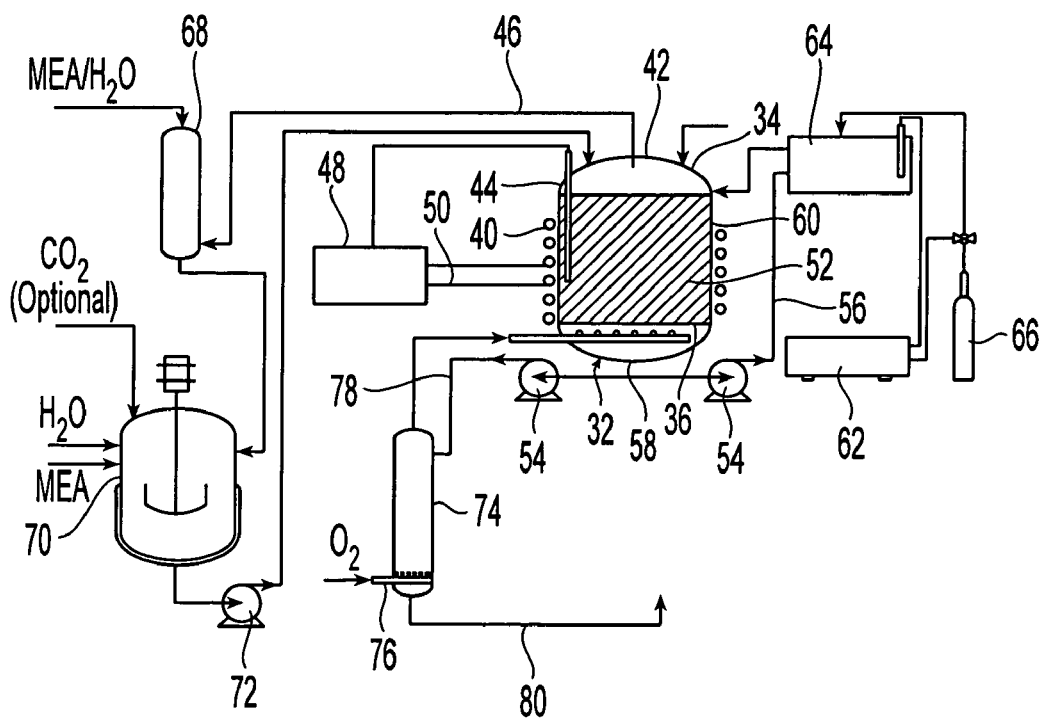
FIG. 4 is a schematic for continuous production of MEA complex of copper solution.

FIG. 4 is a schematic for the continuous production of MEA complex in solution. The dissolver, generally referenced 32, has a chamber 34, with a false bottom 36, and an air sparger 38 located below the false bottom. The chamber is surrounded by a heating coil 40 and has a top 42 through which extend a thermocouple 44 and an outlet 46. The thermocouple is connected to a temperature control unit 48 and supplies heat to the heating coil 40 through conduit 50. Leach liquor 52 is circulated through the chamber by circulation pumps 54 through lines 56,58. A copper mass 60 is present in the chamber and immersed in the leach liquor to enable the dissolution to occur.

The system is also provided with a pH control 62 connected to a specific gravity controller 64 into which carbon dioxide is admitted from tank 66. Carbon dioxide off-gas is directed through line 46 to a carbon dioxide scrubber 68. Carbon dioxide from the scrubber 68 is the fed to chamber 70 containing MEA and water which is pumped via pump 72 to chamber 34. The system also comprises an oxidation chamber 74 into which oxygen is admitted via line 76. Product enters at line 78 and following oxidation exits via line 80 and is transferred to product storage.

EXAMPLES

Examples of the process according to the present invention will now be described. The invention is intended to be illustrated, but not limited, by the examples. Most example described herein use carbonic acid, as opposed to one or more of the preferred acids. The examples are intended to show the process can provide the required product in an economically useful time, i.e., less than one day.

Example—Batch Dissolution

Dissolving studies were conducted either batch-wise or continuously, FIG. 1 shows a conventional batch dissolver used for the batch-wise operation. FIG. 4 shows a continuous dissolution process. The conditions used in the batch experiments are given in Table 1. The temperature was maintained at 45-55° C. The solution concentration of copper (g/l) as a function of dissolution time is shown in Table 2.

TABLE 1

| | Leach Solution | | | | |
|---|---|---|---|---|---|
| EXP # | ID | Amine % | $CO_2$ % | Volume, ml | Cu Charge, g |
| 1 | MEA-$CO_2$ solution | 36.7 | 12 | 600 | 400 |
| 2 | MEA-$CO_2$ solution | 35.9 | 12 | 200 | 200 |

TABLE 2

| | Dissolution Time, hour | | | | | | | |
|---|---|---|---|---|---|---|---|---|
| EXP # | 1 | 2 | 3 | 4 | 5 | 6 | 7 | 8 |
| 1, g Cu/l | 3.7 | 15.7 | 41.3 | 67.8 | 88.2 | 100.3 | | |
| 2, g Cu/l | 5.4 | 16.8 | 67.8 | 85.1 | 102.6 | 119.2 | 126.4 | 136.1 |

In experiments 1 and 2, reported above, average copper dissolution rates of about 17 g/l-hr were achieved over the course of the experiments. At those rates, the process is viable commercially. Raw material costs, processing costs and waste are significantly reduced over the conventional process using copper carbonate.

Example—Batch Preparation of Mea Complex of Copper Carbonate

MEA complex of copper carbonate solutions were prepared by dissolving a copper metal mass in monothanolamine/$CO_2$/$H_2O$ solution in the batch dissolver in the presence of air sparging and at an elevated temperature. FIG. 1 shows a conventional batch dissolver used for the batch-wise operation. Three experiments were conducted using the batch dissolver shown in FIG. 1. In each experiment, about 1200 g copper and 1 liter MEA-$CO_2$—$H_2O$ solution were charged into the dissolver. The circulation pump, airflow and temperature controller were then started. The experimental conditions are given in Table 3. Diisolution data is given in Tables 4, 5, and 6.

TABLE 3

| | MEA-$H_2O$—$CO_2$ Solution | | | | | |
|---|---|---|---|---|---|---|
| Exp ID | MEA/$H_2O$ (Weight ratio) | % $CO_2$ | Sp.G | Air Flow SCFH | Temperature ° C. | Circulation Rate ml/min |
| 1 | 0.900/1.00 | 13.7 | 1.165 | 6.0 | 51 ± 1 | 182 |
| 2 | 0.733/1.00 | 14.1 | 1.160 | 6.0 | 51 ± 1 | 182 |
| 3 | 0.900/1.00 | 13.7 | 1.165 | 6.0 | 76 ± 1 | 182 |

Figure 2:
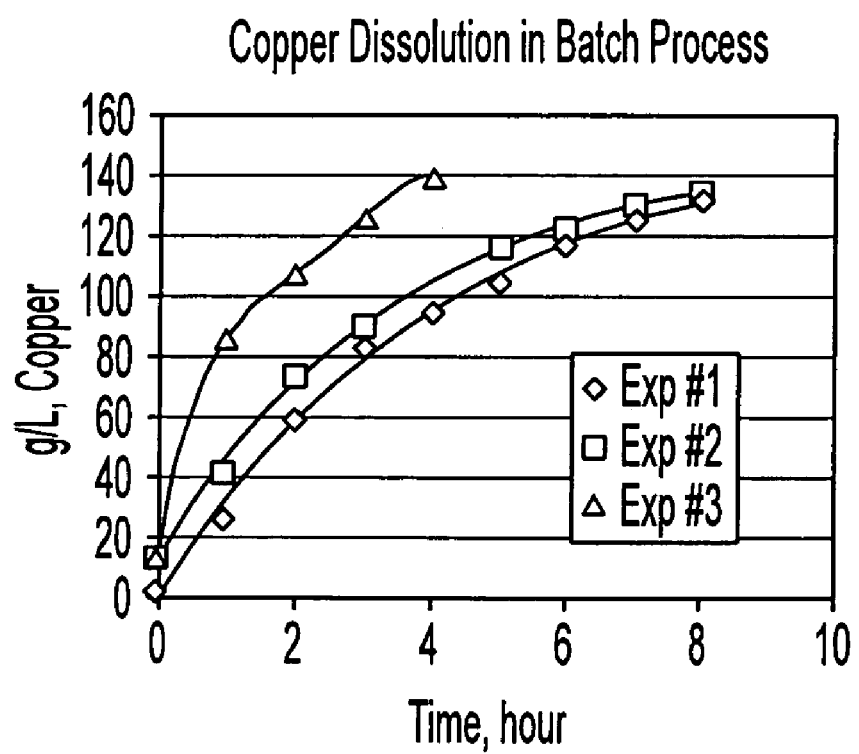
FIG. 2 is a plot showing the copper dissolution in the batch process.
Figure 3:
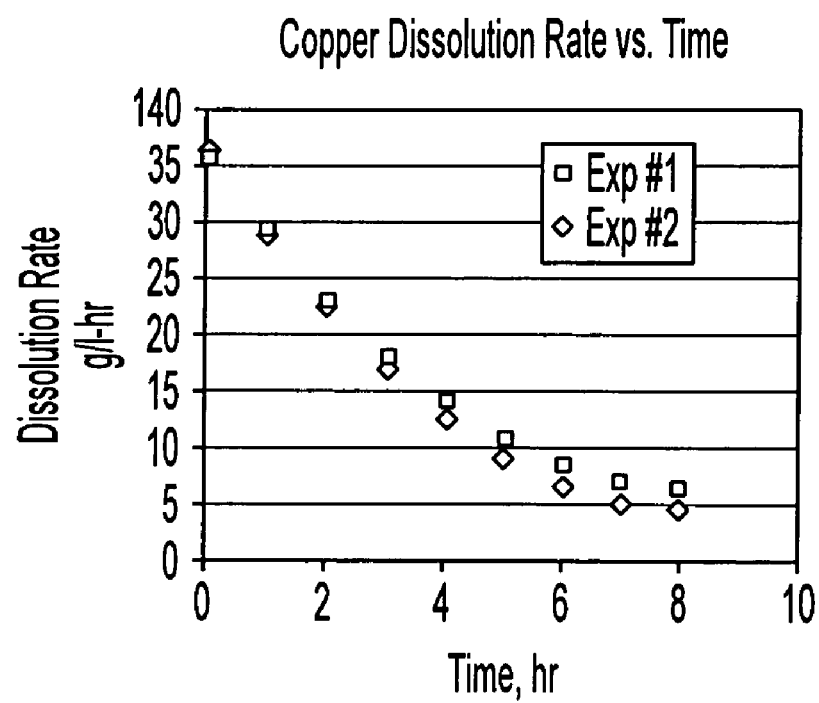
FIG. 3 is a plot showing the copper dissolution rate as a function of time.

When temperature reached the target temperature, the first sample of each batch was taken for analysis, and the timer was started. Complete results of these three dissolving batches are shown below, and are presented in FIGS. 2 and 3. FIG. 2 is a plot showing the copper dissolution in the batch process, and FIG. 3 is a plot showing the copper dissolution rate as a function of time.

TABLE 4

Batch Dissolving - Experiment #1

| Time, hour | % Cu | pH | Sp.G. | Copper, g/L |
|---|---|---|---|---|
| 0 | 0.16 | 8.8 | 1.165 | 1.9 |
| 1 | 2.155 | 9.6 | 1.175 | 25.3 |
| 2 | 4.85 | N/a | 1.205 | 58.4 |
| 3 | 6.73 | 9.45 | 1.228 | 82.6 |
| 4 | 7.66 | 9.6 | 1.239 | 94.9 |
| 5 | 8.36 | 9.6 | 1.251 | 104.5 |
| 6 | 9.23 | 9.6 | 1.262 | 116.5 |
| 7 | 9.79 | N/a | 1.271 | 124.4 |
| 8 | 10.32 | 9.65 | 1.277 | 131.8 |

TABLE 5

Batch Dissolving - Experiment #2

| Time, hour | % Cu | pH | Sp.G. | Copper. g/L |
|---|---|---|---|---|
| 0 | 1.17 | 9.00 | 1.170 | 13.7 |
| 1 | 3.5 | 9.25 | 1.180 | 41.3 |
| 2 | 6.07 | 9.30 | 1.204 | 73.1 |
| 3 | 7.37 | 9.37 | 1.223 | 90.1 |
| 4 | | | | |
| 5 | 9.29 | 9.55 | 1.250 | 116.1 |
| 6 | 9.76 | 9.65 | 1.258 | 122.7 |
| 7 | 10.23 | 9.65 | 1.265 | 129.4 |
| 8 | 10.63 | 9.65 | 1.267 | 134.7 |

TABLE 6

Batch Dissolving - Experiment #3

| Time, hour | % Cu | pH | Sp.G. | Copper. g/L |
|---|---|---|---|---|
| 0 | 1.175 | 9.45 | 1.175 | 13.8 |
| 1 | 7.054 | 9.80 | 1208 | 85.2 |
| 2 | 8.661 | 10.0 | 1.237 | 107.1 |
| 2 | 10.11 | 10.2 | 1.251 | 126.4 |
| 4 | 10.99 | 10.3 | 1.267 | 139.2 |

Example—Continuous Process

A continuous dissolver assembly (see FIG. 4) was used in the experiments described below. The assembly includes a one-liter size packed-tower dissolver (used in the batch dissolving experiments described above), a gravity controller, a temperature controller, a pH monitor, an air flow meter, a circulation pump and a pump for simultaneous withdrawal and replenishment of solutions. The gravity controller held about 1 liter of the product solution. The solution in the assembly was circulated between the specific gravity controller and the dissolver at a constant rate of 325 ml per min. Occasionally, carbon dioxide gas was bubbled through the bottom of the gravity control chamber to adjust the pH of the solution. In all experiments described below, the reaction temperature and specific gravity were controlled at 50±2° C. and 1.271±0.001, respectively. During a continuous dissolving experiment, copper is continuously dissolved and results in a gradual increase in the specific gravity of the copper-containing solution, When the gravity reaches a pre-set value, e.g., 1.272, it triggers a pump to withdraw the product solution and replenish MEA-$CO_2$ solution simultaneously.

Figure 5:
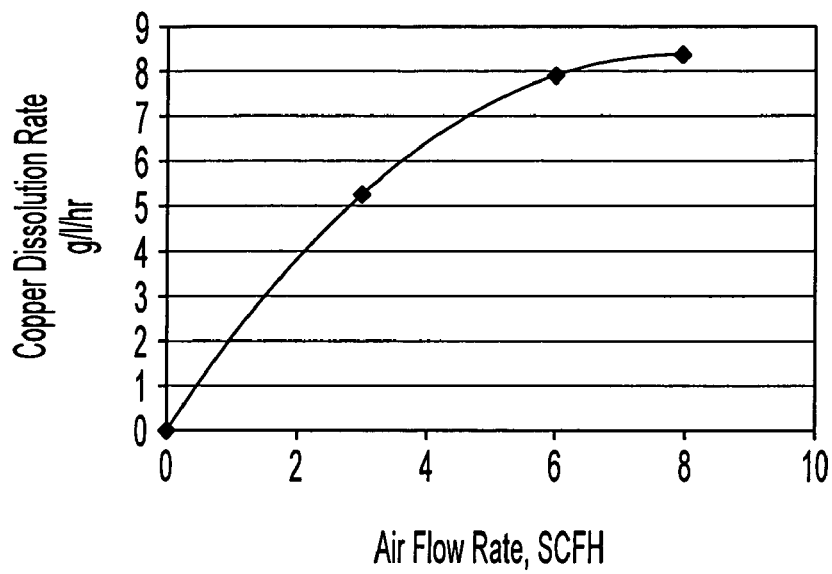
FIG. 5 is a plot showing the copper dissolution rate versus air flow rate in a continuous process at pH 9.6.
Figure 6:
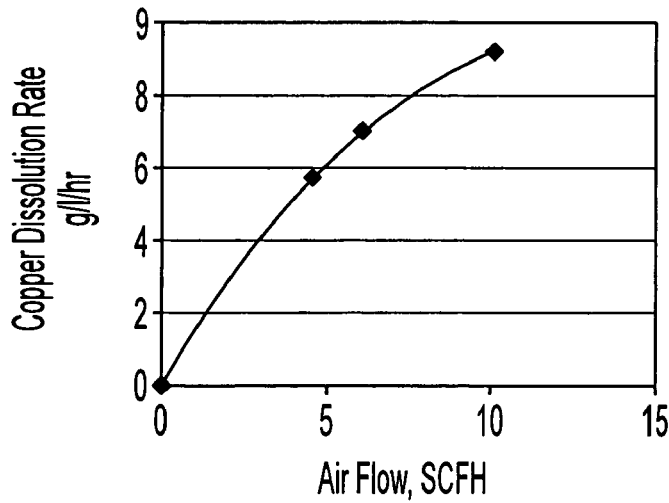
FIG. 6 is a plot showing the copper dissolution rate versus air flow rate in a continuous process at pH 9.5.
Figure 7:
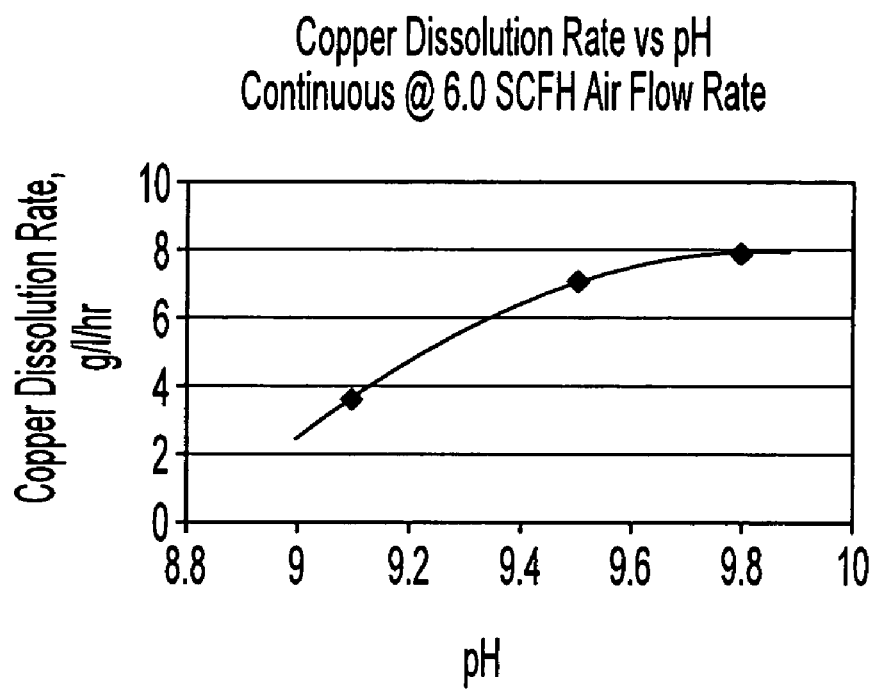
FIG. 7 is a plot showing the copper dissolution rate as a function of pH.

The composition of the MEA-$CO_2$ solution used in all continuous dissolving experiments is the same as that of Example # 3 (Table 3). The dissolver was charged on a daily basis with 1" pieces of 11-13 AWG scrap copper wires and maintained a total copper loading of 1100-1200 grams at any given period of the experiments. Results are shown below in Table 7 along with the experimental conditions used, and are also presented in FIGS. 5-7, FIG. 5 is a plot showing the copper dissolution rate versus air flow rate in a continuous process at pH 9.8, FIG. 6 is a plot showing the copper dissolution rate versus air flow rate in a continuous process at pH 9.5 and FIG. 7 is a plot showing the copper dissolution rate as a function of pH.

TABLE 7

Conditions and Results of Continuous Dissolving Experiments

| Duration | | Air Flow | MEA-Cu—CO Solution | | Copper Dissolution |
|---|---|---|---|---|---|
| Hour | pH | SCFH | Volume, ml | Copper, % | g/l/hr |
| 2.13 | 9.8 | 6.0 | 125 | 10.61 | 7.91 |
| 2.13 | 9.8 | 3.0 | 85 | 10.41 | 5.28 |
| 0.65 | 9.8 | 8.0 | 41 | 10.41 | 8.35 |
| 3.35 | 9.5 | 6.0 | 183 | 10.15 | 7.05 |
| 0.64 | 9.5 | 10.0 | 46 | 10.15 | 9.27 |
| 0.78 | 9.5 | 4.5 | 35 | 10.15 | 5.79 |
| 4.1 | 9.1 | 6.0 | 123 | 9.575 | 3.65 |

Figure 8:
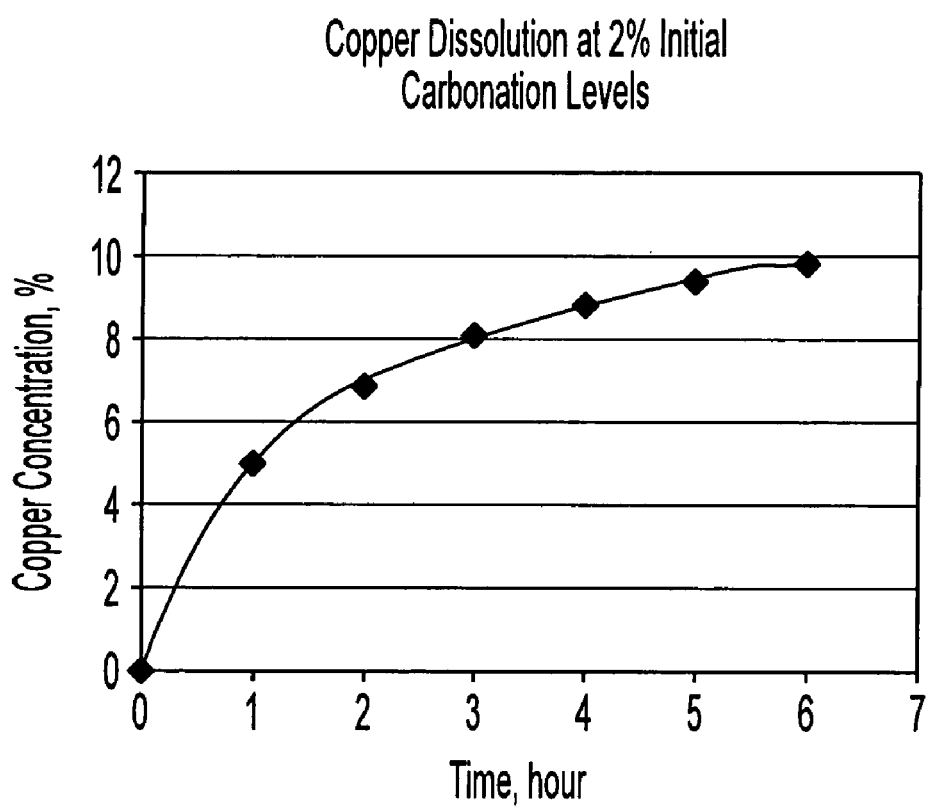
FIG. 8 is a plot showing the copper dissolution in the batch process at relatively low (2% by weight) initial carbon dioxide concentration.

A leach solution using 2% (also one data point for 1% carbonation) carbonation is reported in Table 8 and shown in FIG. 8.

TABLE 8

Summary of Experimental Conditions:

| EXP. # | Leach Solution | | | | |
|---|---|---|---|---|---|
| | ID | Amine, % | $CO_2$ % | Volume ml | Cu Charge, g |
| | MEA-$CO_2$ soin | 39 | 2.0 | 800 | 1250 |
| | MEA-$CO_2$ soin | 39 | 1.0 | 800 | 1250 |

Copper Concentrations (%) as a Function of Dissolution Time:

| | Dissolution Time hour | | | | | |
|---|---|---|---|---|---|---|
| EXP. # | 1 | 2 | 3 | 4 | 5 | 6 |
| 1 | 5.0 | 6.9 | 8.1 | 8.8 | 9.4 | 9.8 |
| 2 | 4.9 | | | | | |

Example—Production Scale Batch Preparation of Mea Complex of Copper Carbonate

Commercial quantities of MEA complex of copper carbonate solutions have been prepared by dissolving a copper metal mass in monoethanolamine/$CO_2$/$H_2O$ solution in an 11,500 gal vessel in the presence of air sparging at an elevated temperature. FIG. 1, the laboratory scale equipment, also conceptually represents the production scale vessel with only two notable exceptions.

Whereas the laboratory scale vessel is glass, the production scale vessel is constructed of a suitable, corrosion resistant material. The selection of materials, e.g., 304 stainless steel, is within the ability of one of ordinary skill in the art. Whereas the laboratory vessel is depicted with a heating mantle, there is a heat exchanger in the recirculation loop in the production equipment that has both heating and cooling capability. Normally, only cooling is required as the simultaneous absorption of $CO_2$ and dissolution of copper metal are both exothermic events.

While the leachate solution can be prepared in situ or external to the dissolving vessel, it has normally been prepared in situ. In the preparation of the leachate, the initial amount of $CO_2$ has been varied to demonstrate the threshold value from which a sustained reaction can be initiated. The quantity of air introduced below the perforated false bottom has been varied to demonstrate the overall and peak dissolution rates. Peak dissolution rates and overall dissolution rates are obviously dependent upon the reaction temperature, the initial and final wt % $CO_2$. It should be noted that the conditions examined herein are constrained only by a combination of an upper temperature, the area of the heat exchanger, and the temperature and flow rate of the cooling tower water for the existing facility. Obviously, faster conversion rates could be attained given additional heat removal capacity so as to maintain the desired temperature. The rate of recirculation through the heat exchanger has been constant at $1/30^{th}$ of the active volume of the vessel. The pH range is somewhat predetermined by the amount of MEA present, the amount of initial $CO_2$ present, the final amount of $CO_2$ added, the degree of conversion from copper metal to complexed copper and the quantity of water. The specific gravity has remained relatively constant.

Numerous batches have been produced reflecting a range of operating parameters:

| Parameter | Minimum | Maximum |
|---|---|---|
| Batch Size in liters | 20,500 | 28,400 |
| Initial $CO_2$ in wt % in leachate | 2.1% | 18.0% |
| Aeration Rate in SF/Sq Ft of X-sectional area | 2.25 | 5.10 |
| Temperature range in deg C. | 18 | 68 |
| Initial pH range | 10.2 | 12.7 |
| Range of average dissolution rates in g/l-h | 8.3 | 17.9 |
| Specific Gravity | 1.250 | 1.268 |

Data regarding specific examples are given below:

| Batch # | Volume | Initial $CO_2$ | Aeration | pH range | Sp Gr | Average Dissolution rate g/l-h/r |
|---|---|---|---|---|---|---|
| 10-107-01 | 20,500 | 8.0% | 5.10 | 12.7 to 10.2 | 1.268 | 8.3 |
| 11-107-01 | 20,500 | 18.0% | 5.10 | 11.2 to 10.2 | 1.260 | 15.6 |
| 11.107-02 | 20,500 | 4.2% | 5.10 | 11.9, const | 1.26 | 16.3 |
| 12-107-01 | 20,500 | 4.2% | 2.25 | 11.9, const | 1.250 | 14.3 |
| 12-107-02 | 20,500 | 2.1% | 2.25 | 12.2 to 11.7 | 1.251 | 17.9 |
| 01.107-03 | 28,400 | 2.1% | 2.25 | 12.1 to 11.0 | 1.256 | 11.2 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for producing a copper-containing aqueous solution comprising between about 90 and about 130 grams of dissolved copper per liter of solution, said process comprising:
   a) providing a leach liquor comprising water, monoethanolamine, and a monoethanolammonium salt, in a reactor wherein said monoethanolammonium salt is produced by admixing at least one acid with an aqueous monoethanolamine composition in an amount sufficient to provide between about 0.05 and about 0.7 equivalents of acid per mole of monoethanolamine, wherein the acid is selected from the group consisting of carbonic acid, phosphoric acid, sulfuric acid, boric acid, nitric acid, hydrofluoric acid, hydrochloric acid, fluoboric acid, oxalic acid, malonic acid, gallic acid, citric acid, ascorbic acid, formic acid, acetic acid, propionic acid, and mixtures thereof, except that if the acid is carbonic acid there is at least one other acid additionally present;
   b) providing a copper mass having a three dimensional open network that is permeable to the leach liquor, wherein the copper mass is present in an amount greater than about 200 grams per liter of leach liquor;
   c) providing to the reactor a gas comprising air, oxygen, or mixture thereof; and
   d) contacting the leach liquor with the air, oxygen, or mixture thereof and with the copper mass, thereby causing dissolution of a portion of the copper mass and forming the copper-containing aqueous solution product comprising between about 90 and about 130 grams of dissolved copper per liter of product, wherein the temperature of the leach liquor is maintained at a temperature between about 18° C. and 100° C. and wherein the average copper dissolution rate is greater than about 2.1 grams of copper per liter of leach liquor per hour.

2. The process of claim 1 wherein the aqueous leach liquor comprises between about 30% and about 45% by weight of total monoethanolamine, and wherein the average copper dissolution rate is greater than about 4.2 grams of copper per liter of leach liquor per hour, so that the aqueous leach liquor dissolves at least 100 grams of copper per liter of aqueous leach liquor in 24 hours or less.

3. The process of claim 1 wherein the aqueous leach liquor dissolves between 100 grams and 130 grams of copper per liter of aqueous leach liquor in 8 hours or less.

4. The process of claim 1 wherein the acid comprises boric acid.

5. The process of claim 1 wherein the pH of the aqueous leach liquor is maintained between 9 and 12.5, and the temperature of the leach liquor is maintained at a temperature between about 40° C. and about 80° C.

6. The process of claim 1 wherein the leach liquor comprises between 3000 to 50% total monoethanolamine and between 2% to 15% boric acid as $H_3BO_3$.

7. The process of claim 1 wherein the leach liquor comprises between 30% to 50% total monoethanolamine and between 5% to 18% hydrochloric acid.

8. The process of claim 1 wherein the leach liquor comprises boric acid and one or more of phosphoric acid, sulfuric acid, and carbonic acid.

9. The process of claim 1 wherein the average copper dissolution rate is at least 17 grams of copper per liter of leach liquor per hour.

10. The process of claim 1 further comprising the step of contacting the copper mass with an acidic composition prior to contacting the copper mass with the leach liquor.

11. The process of claim 10 wherein the acidic composition subsequently forms a component of the leach liquor.

12. The process of claim 8 wherein the aqueous leach liquor dissolves between 100 and 130 grams of dissolved copper per liter in about 4 to about 6 hours.

13. The process of claim 1 further comprising the step of adding to the aqueous leach liquor an amount of copper-containing aqueous solution to provide an initial dissolved copper concentration in the aqueous leach liquor between 1 gram per liter and 17 grams per liter.

14. The process of claim 1 wherein the acid comprises one or more of acetic acid, citric acid, oxalic acid, sulfuric acid, phosphoric acid, and boric acid.

15. The process of claim 1 wherein the leach liquor comprises at least about 0.5 wt. % of a first acid selected from the group consisting of citric acid, oxalic acid, sulfuric acid, phosphoric acid, boric acid, carbon dioxide, and mixtures thereof, and at least 1 wt. % of a second acid, wherein the second acid is different than the first acid.

16. The process of claim 15 wherein the first acid is boric acid and the second acid comprises carbonic acid, citric acid, oxalic acid, malonic acid, acetic acid, formic acid, propionic acid, ascorbic acid, hydrochloric acid, hydrofluoric acid, hydrobromic acid, sulfuric acid, phosphoric acid, nitric acid, fluoroboric acid, or mixtures thereof, wherein the boric acid makes up at least half of the equivalents of the total acids added to the aqueous leach liquor.

17. The process of claim 1 wherein the leach liquor provided consists essentially of the reaction product formed by mixing
water;
30% to 50% total monoethanolamine;
about 0.05 and about 0.7 equivalents of acid selected from the group consisting of carbonic acid, phosphoric acid, sulfuric acid, boric acid, nitric acid, hydrofluoric acid, hydrochloric acid, fluoroboric acid, oxalic acid, malonic acid, gallic acid, citric acid, ascorbic acid, formic acid, acetic acid, propionic acid, and mixtures thereof, per mole of monoethanolamine, except that if the acid is carbonic acid there is at least one other acid additionally present; and
between 0 to about 17 grams of dissolved copper per liter of aqueous leach liquor.

* * * * *